United States Patent
Watanabe et al.

(10) Patent No.: US 6,246,665 B1
(45) Date of Patent: Jun. 12, 2001

(54) METHOD FOR ATTENDING OCCURRENCE OF FAILURE IN AN EXCHANGE SYSTEM THAT EXCHANGES CELLS HAVING FIXED-LENGTH, AND INTERFACE UNIT AND CONCENTRATOR EQUIPPED IN THE EXCHANGE SYSTEM USING THE METHOD

(75) Inventors: Yoshihiro Watanabe; Hiroshi Nishida; Sumie Morita; Kenichi Okabe, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/772,833

(22) Filed: Dec. 24, 1996

(30) Foreign Application Priority Data

Dec. 27, 1995 (JP) .................................................. 7-341176
Jan. 22, 1996 (JP) .................................................. 8-007995

(51) Int. Cl.[7] ...................................................... H04J 3/14
(52) U.S. Cl. .......................................... 370/218; 370/244
(58) Field of Search ..................................... 370/216, 218, 370/230, 231, 232, 235, 242, 244, 245, 250, 253, 252, 395, 389; 379/114, 111; 340/825.16, 825.17

(56) References Cited

U.S. PATENT DOCUMENTS 5,287,349 * 2/1994 Hyodo et al. ............................. 370/60
5,461,607 * 10/1995 Miyagi et al. ............................ 370/16
5,553,057 * 9/1996 Nakayama ............................... 370/13
5,784,358 * 7/1998 Smith et al. ........................... 370/230

FOREIGN PATENT DOCUMENTS 5-268252   10/1993  (JP) .

* cited by examiner

Primary Examiner—Douglas Olms
Assistant Examiner—Ken Vanderpuye
(74) Attorney, Agent, or Firm—Helfgott & Karas, P.C.

(57) ABSTRACT

An ATM exchange system which handles fixed-length cells, such as an ATM exchange, is designed in such a manner that even when a failure occurs particularly in an interface unit or an ATM switch section, downstream stations can be informed of the failure reliably and that when some failure is detected, counting of a charge counter is disabled to always ensure proper charging. For a method of matching between software and hardware in the ATM exchange system including the ATM switch section having a plurality of line associated sections and firmwares associated with those line associated sections, and a call control processor for controlling the ATM switch section, identifiers of an SVC (Switched Virtual Channel) call and a PVC (Permanent Virtual Channel) call are given to connection information of software on the call control processor, connection data affixed with the identifier of the SVC call is released only on the software on the call control processor during a restarting process of the call control processor, and a request to release the SVC call to all the line associated sections in the hardware of the ATM switch section, whereby matching of path information between the software on the call control processor and the hardware of the ATM switch section is performed.

31 Claims, 39 Drawing Sheets

Fig. 21

```
Tag generating algorithm
   for SW-tag 0 to 16
      for interface-tag 0 to 16
   tag = SW-tag + interface-tag
```

Fig. 26

| input VPI/VCI | call DN | call CR | output VPI/VCI | reception DN | reception CR | upper tag | lower tag | SVC/PVC ID flag |
|---|---|---|---|---|---|---|---|---|
| 11/2222 | 1233 | 111 | 22/3333 | 4567 | 222 | 1222 | 2111 | SVC |
| 22/2222 | 1233 |  | 33/3333 | 4567 |  | 4222 | 5111 | PVC |
| 33/2222 | 1233 |  | 44/3333 | 4567 |  | 4222 | 5111 | PVC |
| 44/2222 | 1233 | 222 | 22/3333 | 4567 | 333 | 1222 | 2111 | SVC |
|  |  |  |  |  |  |  |  |  |

Fig. 30

| input VPI/VCI | call DN | call CR | output VPI/VCI | reception DN | reception CR | upper tag | lower tag | SVC/PVC ID flag | execution bit |
|---|---|---|---|---|---|---|---|---|---|
| 11/2222 | 1233 | 111 | 22/3333 | 4567 | 222 | 1222 | 2111 | SVC | |
| 22/2222 | 1233 | | 33/3333 | 4567 | | 4222 | 5111 | PVC | OFF |
| 33/2222 | 1233 | | 44/3333 | 4567 | | 4222 | 5111 | PVC | connection ON |
| 44/2222 | 1233 | 222 | 22/3333 | 4567 | 333 | 1222 | 2111 | SVC | dis-connection ON |
| 55/2222 | 1233 | | 66/3333 | 4567 | | 4222 | 5111 | PVC | |
| | | | | | | | | | |

Fig. 33

| | input VPI/VCI | call DN | call CR | output VPI/VCI | reception DN | reception CR | upper tag | lower tag | SVC/PVC |
|---|---|---|---|---|---|---|---|---|---|
| logical connection information =memory address id | 11/2222 | 1233 | 111 | 22/3333 | 4567 | 222 | 1222 | 2111 | SVC |
| | 22/2222 | 1233 | | 33/3333 | 4567 | | 4222 | 5111 | PVC- |
| | 33/2222 | 1233 | | 44/3333 | 4567 | | 4222 | 5111 | PVC |
| → | 44/2222 | 1233 | 222 | 22/3333 | 4567 | 333 | 1222 | 2111 | SVC |
| | 55/2222 | 1233 | | 66/3333 | 4567 | | 4222 | 5111 | PVC |

| | time of occurrence of event | contents of event | VPI/VCI |
|---|---|---|---|
| logical connection ID = 0 | 08.15.12:13.00 | AIS generated | VPI=3 |
| logical connection ID = 1 | | | |
| logical connection ID = 2 | | | |
| logical connection ID = 3 | | | |

METHOD FOR ATTENDING OCCURRENCE OF FAILURE IN AN EXCHANGE SYSTEM THAT EXCHANGES CELLS HAVING FIXED-LENGTH, AND INTERFACE UNIT AND CONCENTRATOR EQUIPPED IN THE EXCHANGE SYSTEM USING THE METHOD

BACKGROUND OF THE INVENTION

1. Field of the Invention

The present invention relates to a method for attending occurrence of a failure in a fixed-length cell exchange system, which exchanges cells having a fixed-length, or the like, an interface unit and a concentrator both equipped in such a fixed-length cell exchange, and the fixed-length cell exchange system.

This invention also relates to a matching system for use when software on a call control processor does not match with a status of a hardware including a firmware of a communication path system due to restarting or the like of the call control processor.

2. Description of the Related Art

ATM (Asynchronous Transfer Mode) exchange technology has been recommended and accepted as the next-generation exchange system, and has been aggressively studied by various organizations as the promising technology to accomplish a B-ISDN (Broadband-Integrated Services Digital Network).

FIG. 1 is a block diagram showing the schematic structure of an ordinary ATM exchange system. As shown in FIG. 1, an ordinary ATM exchange system comprises an ATM exchange 100, interface units 201 to 203 like UNI (User Network Interface) or NNI (Network Node Interface), and concentrators (or distribution units) 301 to 303 which concentrate (or distribute) the inputs and outputs of the respective interface units 201–203. Those interface units 201–203 are connected to the ATM exchange 100 via the concentrators 301–303, respectively.

The ATM exchange 100 is a switching section which deals with fixed-length data called as ATM cell having a fixed-length (normally, 53-byte length data consisting of a 5-byte header, which is a control information portion storing a transfer destination of the data or the like and a 48-byte data portion), and the switching section transmits and receives ATM cells via the interface units 201–203, and is designed to be able to a synchronously transfer (exchange) each ATM cell to the associated transfer destination in accordance with the header affixed to that ATM cell.

As shown in FIG. 1, therefore, the ATM exchange 100 normally comprises an ATM switch (exchange switch) 101, the so-called self-routing switch, which automatically determines the transfer path of an ATM cell, a main controller (CC) 102, which performs various controls of the components of the ATM exchange 100 including this ATM switch 101, and a main memory 103 which retains software for this main controller 102.

In this ATM exchange system, an ATM cell which is sent from a terminal accommodated in the interface unit 201 is input via the concentrator 301 to the ATM exchange 100 where the ATM switch 101 automatically selects the cell transfer path in accordance with the header affixed to this ATM cell and the ATM cell is then sent to the terminal or the like of the transfer destination via the concentrator 302, the interface unit 202 (or the concentrator 303 and the interface unit 203).

When a failure occurs in, for example, the ATM layer (cell multiplex/exchange layer) to the interface unit 201 in this ATM exchange system, the failure is detected by the interface unit 201, which in turn sends out an AIS (Alarm Indication Signal) cell of VP (Virtual Path)/VC (Virtual Channel) in the downstream direction of the ATM cell (toward the ATM switch 101), as indicated by the broken lines in FIG. 1, thereby informing the downstream stations on the side of the interface units 202 and 203 of the occurrence of the failure.

When the failure is cleared, the associated interface unit 201 stops sending the AIS cell to inform the downstream stations of the clearing of the failure.

While the above ATM exchange system can inform the downstream stations of the occurrence of a failure in an ATM layer (cell multiplex/exchange layer), there is no established way, at present, of informing the downstream stations of a failure if occurred in a line layer or the exchange switch section (ATM switch 101). Therefore, the latter failure cannot be detected by the downstream stations.

Even in the case where a failure in the ATM layer can be informed to the downstream stations, if some kind of an abnormality like a device failure occurs in the unit which detects the ATM layer failure and sends out the AIS cell (e.g., the interface unit 201), the AIS cell cannot be sent out, disabling the proper informing of the downstream stations of the ATM layer failure and the clearing of such a failure.

The ATM exchange system is generally provided with charge counters (cell counters) on the respective interface units 201–203 to charge subscribers. When a failure occurs in a line layer, an ATM layer, any of the interface units 201–203, the ATM switch 101 or the like, the number of input/output cells to the charge counter on each of the interface units 201–203 differs from the proper one, so that the accurate cell charge cannot be accomplished.

The B-ISDN based ATM exchange system, unlike the N-ISDN (Narrowband-Integrated Service Digital network) exchange system, can set a vast amount of logic paths to a single interface. For instance, the N-ISDN can set merely two channels (B/D) on the 64 Kbps interface, whereas the ATM exchange system can set a total of $2^{24}$ paths on a single interface by the virtual path identifier (VPI)=8 bits and virtual channel identifier (VCI)=16 bits according to the user-network interface (UNI) or the communication protocol which is defined by the demarcation point between a user's equipment (terminal or the like) and the network equipment.

With regard to a network-node interface (NNI) which is the interface for network nodes such as an exchange apparatus and a multiplexing apparatus, a total of $2^{28}$ paths can be set by VPI=12 bits and VCI=16 bits.

From the global viewpoint of the system, the number of paths should further be multiplied by the number of interfaces the system can accommodate.

When a call control processor which was disabled due to some kind of a failure or the like has been restored and has resumed its operation, the software status and the hardware (firmware) may not match with each other. In this sense, some kind of matching process should be performed.

When there are an incomparable number of connections as compared with that for the N-ISDN (which involves about two connections per interface), the matching between the software and hardware statuses after the restarting of the system takes time, which may result in a considerable time of service interruption.

Data that should be matched between the software and hardware include connection information (the input VPI/VCI, output VPI/VCI, tag information, usage parameter control (UPC) information, network parameter control (NPC) information, and the like) and failure information the hardware detects by itself (the virtual path alarm indication signal (VP-AIS), virtual channel alarm indication signal (VC-AIS) and the like). It is important to quickly match this information.

The usage parameter control or UPC is based on the overall capacity management which is performed even on a burst traffic in the ATM exchange in order to effectively use the network equipment. When a specific call causes a cell whose capacity exceeds the contracted capacity to flow, the communication quality of the entire network may be degraded.

A network which receives a call should therefore detect if the specified transfer capacity matches with the actual flow rate of cells, and executes a process of abandoning a cell which violates the rules when the actual traffic goes beyond the specified value for each contract with a subscriber. This control is called UPC.

The network parameter control or NPC is the control which is performed on a network node interface whereas UPC is performed on a user network interface.

The virtual path alarm indication signal or VP-AIS and the virtual channel alarm indication signal or VC-AIS are alarm signals that are sent to downstream nodes by a node which has detected an error to inform the detection of the error.

Each subscriber should contract a virtual channel (VC) between terminals with a network provider. This contract can allow each user network to be built up. This is called a virtual channel service (or ATM service).

In this case, the number of each virtual channel (VC) should be previously determined at the time of making a contract with the network provider, and the service of previously determining the number of a virtual channel (VC) is called a permanent virtual channel (PVC) service. The service in which connection to a virtual channel is established each occasion is called a switched virtual channel (SVC) service.

When a serious failure occurs in this service, the use of the temporary memory cannot be guaranteed so that everything should be released for an SVC call. Since over charging should be avoided for an SVC call, releasing should be carried out quickly.

With regard to a PVC which is assigned to an emergency call or the like with priority, unless nothing is wrong with the switch system, the service should continue as long as possible. For a light failure, however, the environment of the execution of a task cannot be inherited while the use of the temporary memory is guaranteed.

Under this situation, if the call control processor restarts the processing after the detection of a change in the hardware status before the software status is changed, failure information detected by the hardware itself cannot be recognized by the software. In this case, the software performs the normal process.

If the software is restarted while the hardware is detecting the restoration of a failed unit, the software cannot recognize the restoration and is thus unable to receive a new call endlessly.

In addition, as the B-ISDN unlike the N-ISDN has innumerable logic paths on each interface line, an inquiry about the state of each line by the software takes a considerable time until the service can become available after the call control processor has restarted the process. In this respect, the technique of shortening the time needed for the matching process is essential.

At present, however, even in an ATM exchange, actually, software sends data it holds to hardware (firmware) based on the N-ISDN for matching of pass information or matching of failure information of a virtual path VP or a virtual channel VC for each interface, and no consideration is given to the system which can shorten the matching time.

SUMMARY OF THE INVENTION

Accordingly, it is a primary object of the present invention to provide a failure attending method for a fixed-length cell exchange system, an interface unit and a concentrator both equipped in a fixed-length cell exchange, and a fixed-length cell exchange system, all of which can allow a failure occurring in any of a line layer, a cell multiplex/exchange layer, any interface unit and an exchange switch section to be informed to the downstream stations like the other interface units.

It is another object of the present invention to provide a failure attending method for a fixed-length cell exchange system, an interface unit and a concentrator both equipped in a fixed-length cell exchange, and a fixed-length cell exchange system, all of which can permit charge counters to stop counting to thereby giving the proper charge even when a failure occurs in any of a line layer, a cell multiplex/exchange layer, any interface unit and an exchange switch section.

It is a further object of the present invention to provide a system of matching software with hardware in an ATM exchange system in order to overcome the above-described problems.

It is a still further object of the present invention to provide a software-hardware matching system for an ATM exchange system, which can execute a releasing process for an SVC call and a matching process for a PVC call at a high speed when a serious failure occurs in a call control processor and can receive a new call shortly after the system process is restarted.

It is a yet still further object of the present invention to provide a software-hardware matching system for an ATM exchange system, which allows firmware at a location associated with each line to perform matching processes for the VP status and the VC status in parallel and to inform a call control processor of only the difference, thereby reducing the load on the call control processor.

BRIEF DESCRIPTION OF THE DRAWINGS

FIG. 21 is a diagram exemplifying an algorithm for generating all tags which is used in the mode in FIG. 19;

FIG. 26 is a diagram depicting connection information on a software memory in the software-hardware matching method in the ATM exchange system of this invention;

FIG. 30 is a diagram exemplifying data on a memory in the software-hardware matching method in the ATM exchange system of this invention;

FIG. 33 is a diagram for explaining one example of a logic connection id in the software-hardware matching method in the ATM exchange system of this invention;

DETAILED DESCRIPTION OF THE PREFERRED EMBODIMENTS

Figure 1:
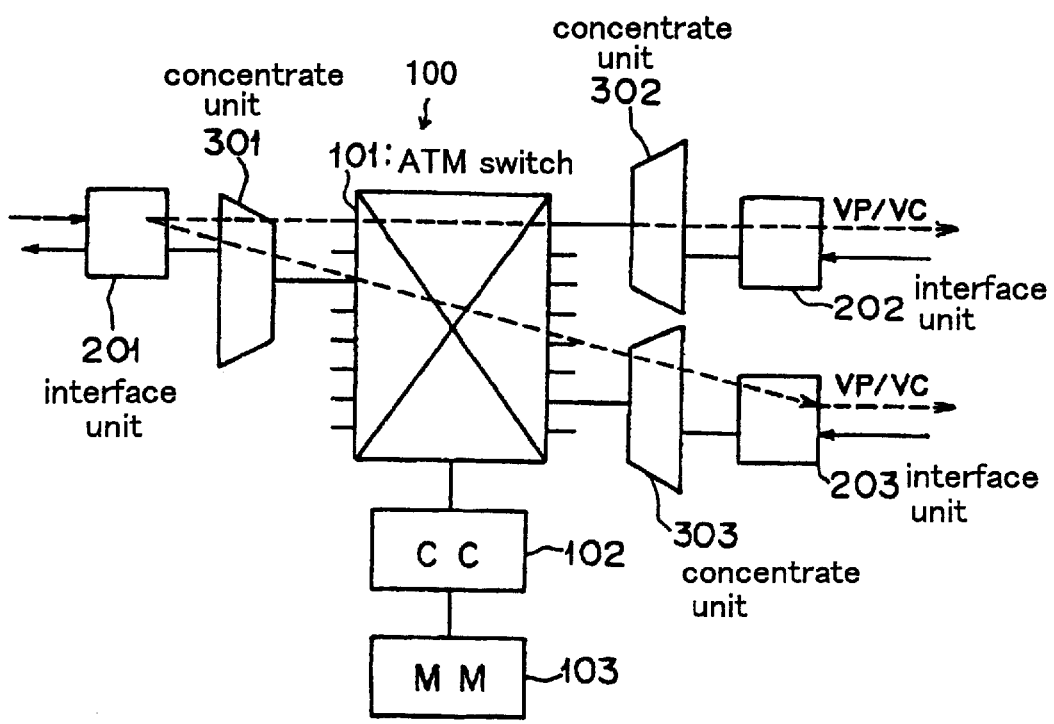
FIG. 1 is a block diagram illustrating the schematic structure of an ordinary ATM exchange system.

The preferred embodiments according to the present invention will now be described with reference to the accompanying drawings. Like or same reference numerals or reference symbols are given to corresponding components in different embodiments in the drawings as needed.

Figure 2:
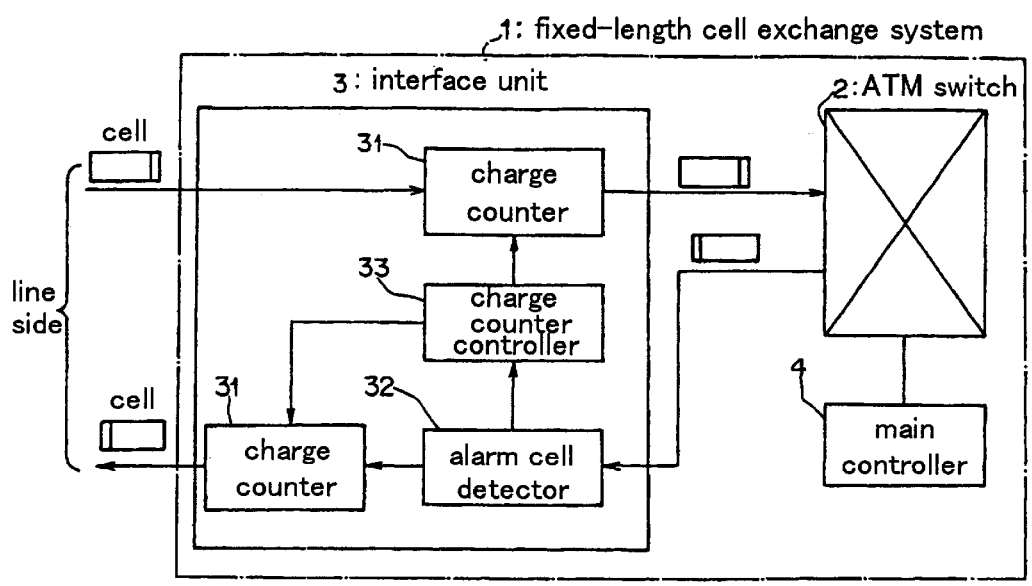
FIG. 2 is a block diagram showing the principle of the first embodiment of this invention.

FIG. 2 is a block diagram showing the principle of the first embodiment of this invention. In FIG. 2, reference numeral "1" denotes a fixed-length cell exchange system like an ATM exchange system which handles fixed-length cells. The fixed-length cell exchange system 1 comprises an ATM switch 2, and interface units 3 connected to the input and output sections of this ATM switch 2.

In FIG. 2, an concentrator (shown in FIG. 1) provided between the interface unit 3 and the ATM switch 2 is not illustrated, and since the interface units 3 have the same structure, only those portions of one interface unit 3 which are directly related to this embodiment of the invention are illustrated.

In this embodiment, the interface unit 3 includes charge counters 31, an alarm cell detector 32 and a charge counter controller 33. Reference numeral "4" is a call control processor for the ATM switch 2.

The alarm cell detector 32 detects an alarm cell which is transmitted when a failure occurs in the cell multiplex/exchange layer that executes multiplexing and exchange of cells. When the alarm cell detector 32 detects an alarm cell, the charge counter controller 33 disables the counting of the charge counter 31 for the associated connection.

When the alarm cell detector 32 detects the disabled transmission of an alarm cell, the charge counter controller 33 restarts the counting of the charge counter 31 for the associated connection.

In the fixed-length cell exchange system 1 with this structure, an alarm cell which is transmitted upon occurrence of a failure in the cell multiplex/exchange layer is received by the interface unit 3 where the alarm cell detector 32 detects this alarm cell and the charge counter controller 33 disables the counting of the charge counter 31 for the associated connection.

When the alarm cell detector 32 detects the disabled transmission of the alarm cell, the charge counter controller 33 restarts the counting of the charge counter 31 for the associated connection.

Figure 3:
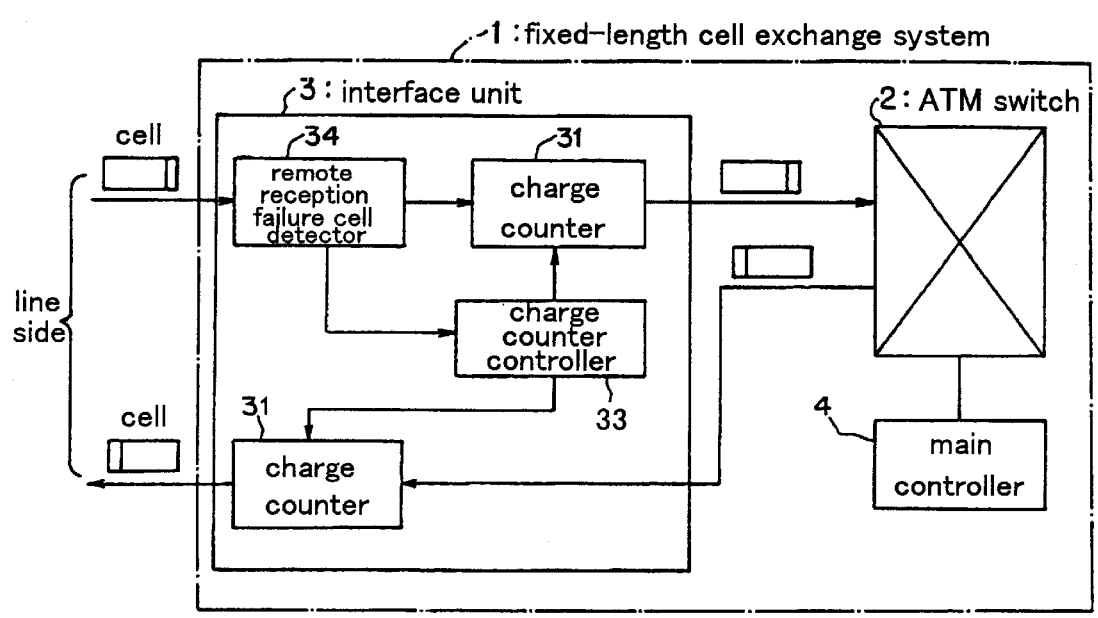
FIG. 3 is a block diagram showing the principle of the second embodiment of this invention.

FIG. 3 is a block diagram showing the principle of the second embodiment of this invention. In FIG. 3, reference numeral "1" also denotes a fixed-length cell exchange system which handles fixed-length cells and which comprises an ATM switch 2, and interface sections (interface units) 3 connected to the input and output sections of this ATM switch 2.

In the structure in FIG. 3, the interface unit 3 includes charge counters 31, a remote reception failure cell detector 34, and a charge counter controller 33. Reference numeral "4" also denotes a call control processor for the ATM switch 2 in FIG. 3.

The remote reception failure cell detector 34 detects a remote reception failure cell which is transmitted from an end terminal (subscriber terminal or the like) of the cell multiplex/exchange layer that executes multiplexing and exchange of cells, when a failure occurs in this cell multiplex/exchange layer. When the remote reception failure cell detector 34 detects a remote reception failure cell, the charge counter controller 33 disables the counting of the charge counter 31 for the associated connection.

When the remote reception failure cell detector 34 detects the disabled transmission of a remote reception failure cell, the charge counter controller 33 restarts the counting of the charge counter 31 for the associated connection.

In the fixed-length cell exchange system 1 with this structure, when a remote reception failure cell which is transmitted by an end terminal (subscriber terminal or the like) of the cell multiplex/exchange layer upon occurrence of a failure in this cell multiplex/exchange layer is received by the interface unit 3, the remote reception failure cell detector 34 detects this remote reception failure cell and the charge counter controller 33 disables the counting of the charge counter 31 for the associated connection.

When the remote reception failure cell detector 34 detects the disabled transmission of the remote reception failure cell, the charge counter controller 33 restarts the counting of the charge counter 31 for the associated connection.

Figure 4:
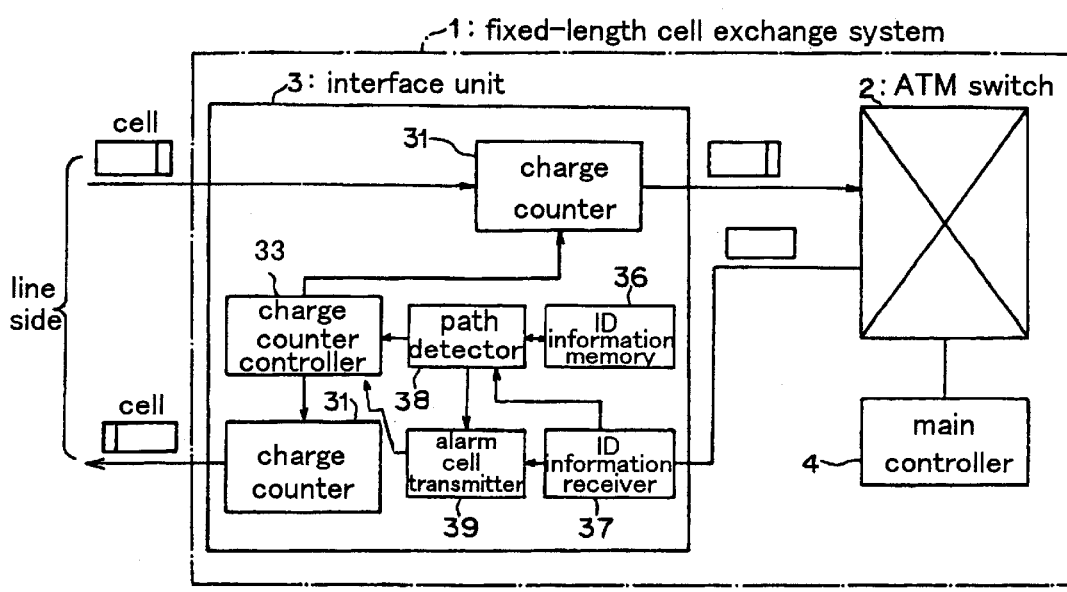
FIG. 4 is a block diagram illustrating the principle of the third embodiment of this invention.

FIG. 4 is a block diagram showing the principle of the third embodiment of this invention. In FIG. 4, reference numeral "1" also denotes a fixed-length cell exchange system which handles fixed-length cells and which comprises an ATM switch 2, a call control processor 4 for this ATM switch 2, and a plurality of interface sections (interface units) 3 connected to the input and output sections of this ATM switch 2. Each interface unit 3 includes charge counters 31, an identification (ID) information memory 36, an ID information receiver 37, a path detector 38, an alarm cell transmitter 39 and a charge counter controller 33.

The ID information memory 36 stores ID information specific to opposed units, and the ID information receiver 37 receives the specific ID information about a failed interface unit 3 from the call control processor 4 for the ATM switch 2. When the ID information receiver 37 receives the specific ID information about the failed interface unit 3, the path detector 38 searches the ID information memory 36 to detect the path which matches with the informed specific ID information.

The alarm cell transmitter 39 transmits an alarm cell to the path detected by this path detector 38, and the charge counter controller 33 disables the counting of the charge counter 31 for the path detected by the path detector 38.

When informed of the restoration of the failed interface unit 3 by the call control processor 4, the alarm cell transmitter 39 stops sending the alarm cell.

When the transmission of the alarm cell from the alarm cell transmitter 39 is stopped, the charge counter controller 33 restarts the counting of the charge counters 31.

In the thus constituted fixed-length cell exchange system 1, when a path is connected to each interface unit 3, specific ID information to the opposed unit is affixed to path information and resultant information is stored in the ID information memory 36.

With paths set in this manner, when one of the interface units 3 fails, the call control processor 4 informs the other interface units 3 of the specific ID information of the failed interface unit 3.

In each interface unit 3 whose ID information receiver 37 has received the specific ID information of the failed interface unit 3, the path detector 38 searches the ID information memory 36 to detect the path which matches with the informed specific ID information. The alarm cell transmitter 39 transmits an alarm cell to the path detected by this path detector 38.

When the failed interface unit 3 is restored, the call control processor 4 informs the other interface units 3 of the restoration, and the alarm cell transmitters 39 in the informed interface units 3 stop sending the alarm cells.

In each interface unit 3 whose ID information receiver 37 has received the specific ID information of the failed interface unit 3, as mentioned above, an alarm cell is transmitted to the path which matches with the informed ID information and the charge counter controller 33 disables the counting of the charge counters 31.

When the failed interface unit 3 is restored, the call control processor 4 informs the other interface units 3 of the restoration and the informed interface units 3 stop sending the alarm cells. Further, the charge counter controller 33 restarts the counting of the charge counters 31.

Figure 5:
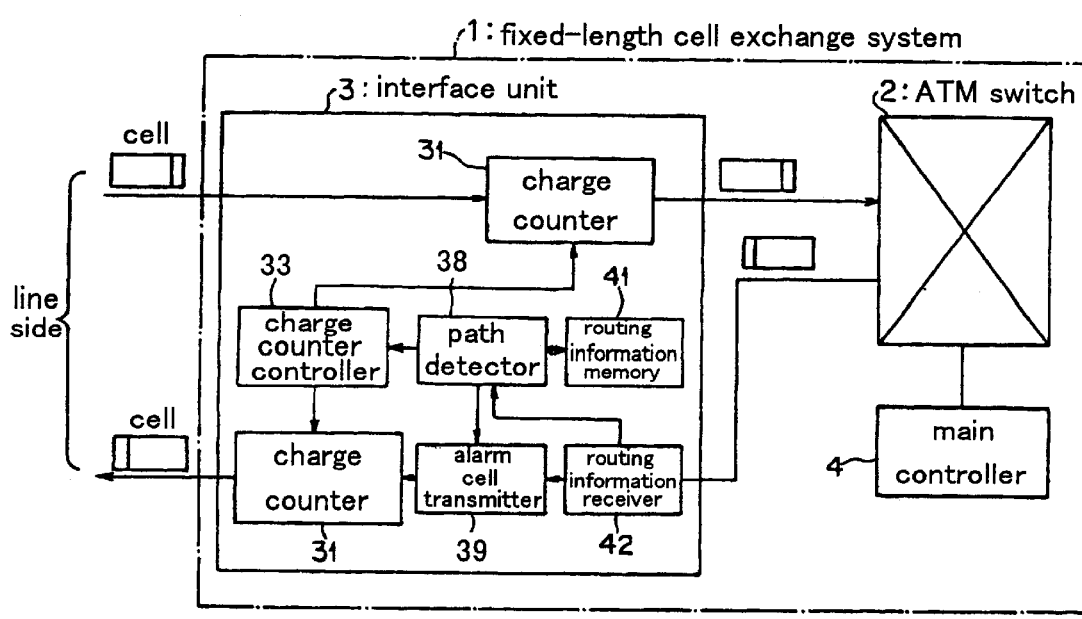
FIG. 5 is a block diagram illustrating the principle of the fourth embodiment of this invention.

FIG. 5 is a block diagram showing the principle of the fourth embodiment of this invention. In FIG. 5, reference numeral "1" also denotes a fixed-length cell exchange system which handles fixed-length cells. This fixed-length cell exchange system 1 comprises an ATM switch 2, a call control processor 4 for this ATM switch 2, and a plurality of interface sections (interface units) 3 connected to the input and output sections of this ATM switch 2. As shown in FIG. 5, each interface unit 3 includes charge counters 31, a routing information memory 41, a routing information receiver 42, a path detector 33, an alarm cell transmitter 39 and a charge counter controller 33.

The routing information memory 41 stores routing information, and the routing information receiver 42 receives routing information about a failed interface unit 3 from the call control processor 4 for the ATM switch 2. When the routing information receiver 42 receives the routing information about the failed interface unit 3, the path detector 38 searches the routing information memory 41 to detect the path which matches with the informed routing information.

The alarm cell transmitter 39 transmits an alarm cell to the path detected by this path detector 38, and the charge counter controller 33 disables the counting of the charge counter 31 for the path detected by the path detector 38.

In this embodiment, the alarm cell transmitter 39 is also designed to stop sending the alarm cell when informed of the restoration of the failed interface unit 3 by the call control processor 4. When the transmission of the alarm cell from the alarm cell transmitter 39 is disabled, the charge counter controller 33 restarts the counting of the charge counters 31.

In the thus constituted fixed-length cell exchange system 1, when one of the interface units 3 fails, the call control processor 4 informs the other interface units 3 of the routing information about the failed interface unit 3.

In each interface unit 3 which has received the routing information about the failed interface unit 3, the path detector 38 detects the path which matches with the informed routing information. Then, the alarm cell transmitter 39 transmits an alarm cell to the path detected by this path detector 38.

When the failed interface unit 3 is restored, the call control processor 4 informs the other interface units 3 of the restoration, and the alarm cell transmitters 39 in the informed interface units 3 stop sending the alarm cells.

In each interface unit 3 whose routing information receiver 42 has received the routing information about the failed interface unit 3, as mentioned above, an alarm cell is also transmitted to the path which matches with the informed routing information and the charge counter controller 33 disables the counting of the charge counters 31.

When the failed interface unit 3 is restored, the call control processor 4 informs the other interface units 3 of the restoration. In each informed interface unit 3, the alarm cell transmitter 39 stops sending the alarm cell and the charge counter controller 33 restarts the counting of the charge counters 31.

Figure 6:
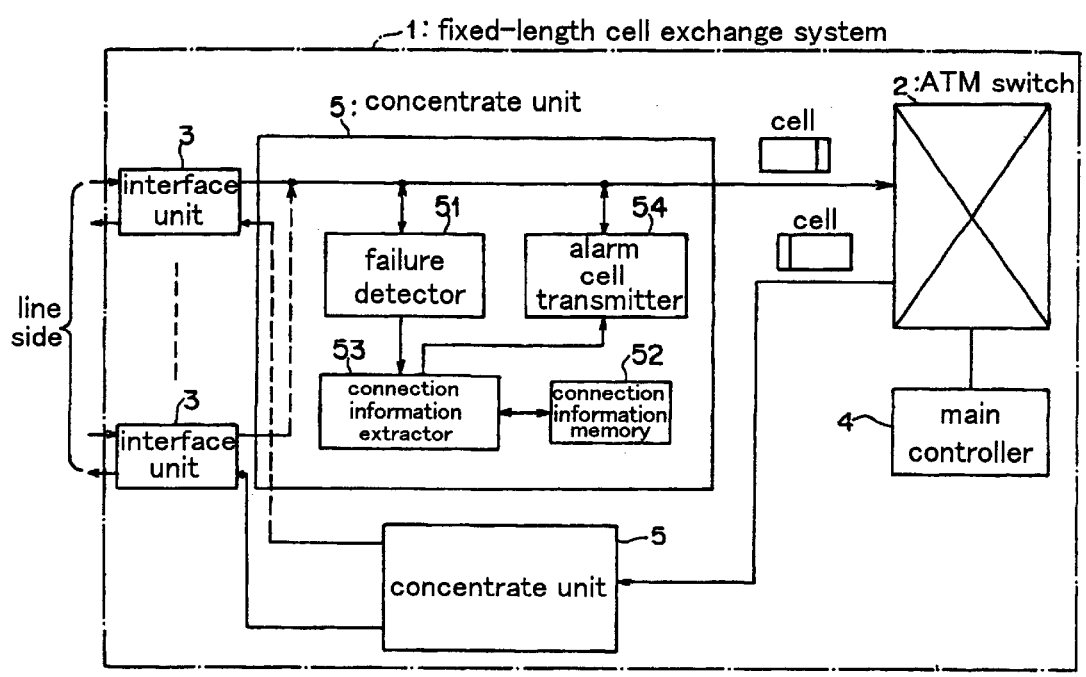
FIG. 6 is a block diagram showing the principle of the fifth embodiment of this invention.

FIG. 6 is a block diagram showing the principle of the fifth embodiment of this invention. In FIG. 6, reference numeral "1" denotes a fixed-length cell exchange system which handles fixed-length cells. This fixed-length cell exchange system 1 comprises an ATM switch 2, a call control processor 4 for this ATM switch 2, a plurality of interface sections (interface units) 3 connected to the input and output sections of this ATM switch 2, and a plurality of concentration sections (concentrators) 5 which concentrate the input/output information of the associated interface units 3.

Each concentration section 5 includes a failure detector 51, a connection information memory 52, a connection information extractor 53 and an alarm cell transmitter 54.

The failure detector 51 detects a failure occurring in the associated interface unit 3. The connection information memory 52 stores connection information about the connection to the associated interface unit 3.

When the failure detector 51 detects a failure in the associated interface unit 3, the connection information extractor 53 searches the connection information stored in the connection information memory 52 to extract connection information about all the connections to the failed interface unit 3. The alarm cell transmitter 54 transmits an alarm cell to every connection extracted by the connection information extractor 53.

The alarm cell transmitter 54 is designed to stop sending the alarm cell when informed of the restoration of the failed interface unit 3.

In the thus constituted fixed-length cell exchange system 1, when a failure in one interface unit 3 is detected by the failure detector 51 in the associated concentration section 5, the connection information extractor 53 searches the connection information stored in the connection information memory 52 to extract connection information about all the connections to the failed interface unit 3. The alarm cell transmitter 54 transmits an alarm cell to every connection extracted by the connection information extractor 53.

When the failed interface unit 3 is restored, the call control processor 4 informs the other interface units 3 of the restoration. The concentration section 5 which has been informed of such restoration stops sending the alarm cell from the alarm cell transmitter 54.

When a failure in any interface unit 3 is detected by the associated concentration section 5, this concentration section 5 (alarm cell transmitter 54) transmits an alarm cell to every connection. At this time, the charge counter 31 in the failed interface unit 3 stops counting.

When the failed interface unit 3 is restored, the call control processor 4 informs the other interface units 3 of the restoration. The alarm cell transmitter 54 in each informed concentration section 5 stops sending the alarm cell and the charge counters in the restored interface unit 3 restart counting.

Figure 7:
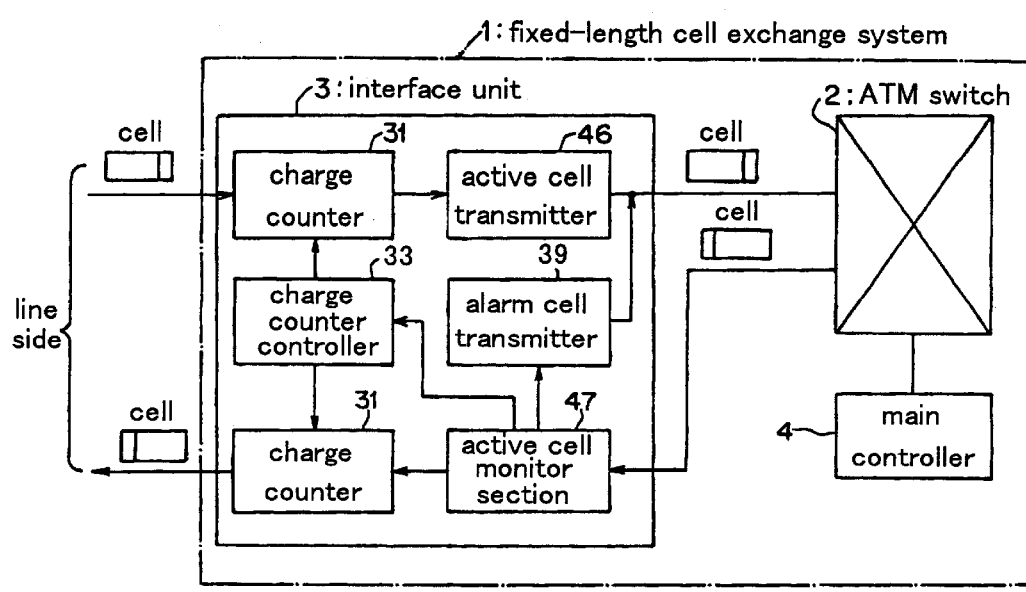
FIG. 7 is a block diagram illustrating the principle of the sixth embodiment of this invention.

FIG. 7 is a block diagram showing the principle of the sixth embodiment of this invention. In FIG. 7, reference numeral "1" also denotes a fixed-length cell exchange system which handles fixed-length cells and which comprises an ATM switch 2, a call control processor 4 for this ATM switch 2, and a plurality of interface sections (interface units) 3 connected to the input and output sections of this ATM switch 2.

Each interface unit 3 includes charge counters 31, an active cell transmitter 46, an active cell monitor section 47, an alarm cell transmitter 39 and a charge counter controller 33.

The active cell transmitter 46 sends an active cell to the other interface units 3 in a predetermined period via permanent connections established between the other interface units 3. The active cell monitor section 47 monitors active cells sent from the other interface units 3. When this active cell monitor section 47 detects that active cells are not received at predetermined intervals, the alarm cell transmitter 39 transmits an alarm cell to every connected path, and the charge counter controller 33 disables the counting of the charge counters 31.

When the active cell monitor section 47 detects that active cells are received again at predetermined intervals after the transmission of the alarm cell, the alarm cell transmitter 39 stops sending the alarm cell. When the transmission of the alarm cell from the alarm cell transmitter 39 is disabled, the charge counter controller 33 restarts the counting of the charge counters 31.

In the thus constituted fixed-length cell exchange system 1, the active cell transmitter 46 in each interface unit 3 sends an active cell to the other interface units 3 in a predetermined period and the active cell monitor section 47 monitors active cells sent from the other interface units 3.

When this active cell monitor section 47 detects that active cells are not received at predetermined intervals, the alarm cell transmitter 39 transmits an alarm cell to every connected path and the charge counter controller 33 disables the counting of the charge counters 31.

In other words, the fixed-length cell exchange system 1 shown in FIG. 7 is designed in such a manner that each interface unit 3 sends an active cell to the other interface units 3 in the predetermined period via the permanent connections established between the other interface units 3, the active cell monitor section 47 in each interface unit 3 monitors active cells sent from the other interface units 3 than the local interface unit 3, and when active cells are not received at predetermined intervals, the alarm cell transmitter 39 transmits an alarm cell to every connected path.

When it is detected after the transmission of the alarm cell that active cells are received at predetermined intervals, the alarm cell transmitter 39 stops sending the alarm cell.

In the case where active cells from the other interface units 3 than the local interface unit 3 are not received at predetermined intervals, an alarm cell is sent to every connected path as mentioned above, and at the same time the charge counter controller 33 disables the counting of the charge counters 31.

When it is detected after the transmission of the alarm cell that active cells are received at predetermined intervals, the alarm cell transmitter 39 stops sending the alarm cell and the charge counter controller 33 restarts the counting of the charge counters 31.

Figure 8:
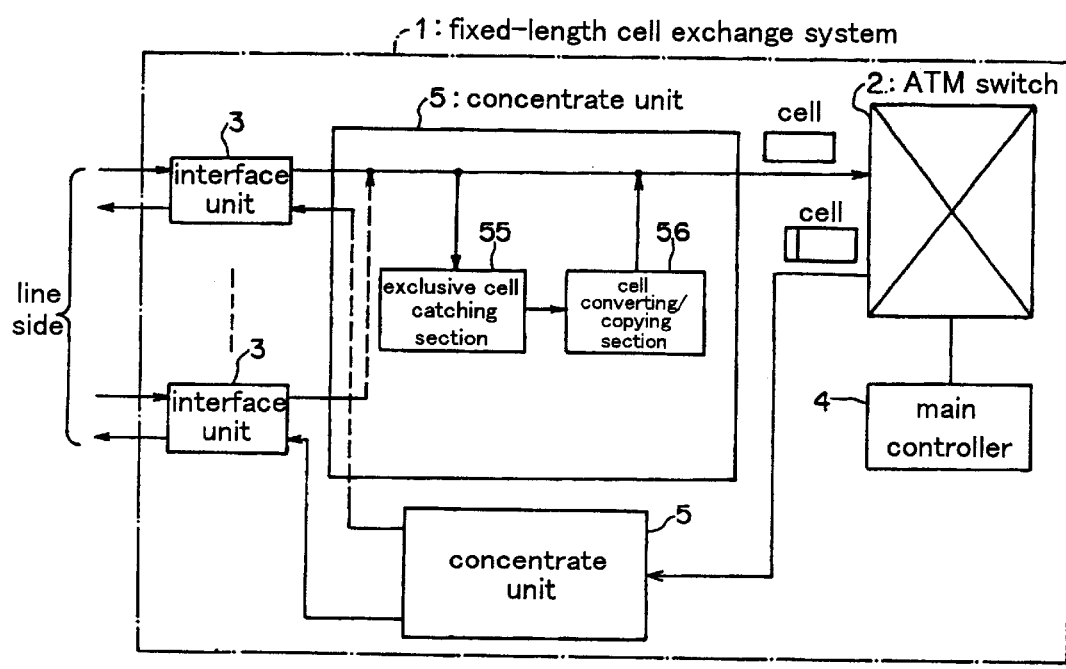
FIG. 8 is a block diagram showing the principle of the seventh embodiment of this invention.

FIG. 8 is a block diagram showing the principle of the seventh embodiment of this invention. In FIG. 8, reference numeral "1" also denotes a fixed-length cell exchange system which handles fixed-length cells. This fixed-length cell exchange system 1 comprises an ATM switch 2, a call control processor 4 for this ATM switch 2, a plurality of interface sections (interface units) 3 connected to the input and output sections of this ATM switch 2, and a plurality of concentration sections (concentrators) 5 which concentrate the input/output information of the associated interface units 3. Each concentration section 5 includes an exclusive cell catching section 55 and a cell converting/copying section 56.

The exclusive cell catching section 55 catches a local exclusive cell from the associated interface unit 3, which carries ID information specific to that interface unit 3 or routing information about that interface unit 3. When the exclusive cell catching section 55 catches a local exclusive cell, the cell converting/copying section 56 affixes all routing information to the local exclusive cell and copies the resultant local exclusive cell to provide a plurality of local exclusive cells having the same contents.

In this fixed-length cell exchange system 1, when the exclusive cell catching section 55 in each concentration section 5 catches a local exclusive cell from the associated interface unit 3, which carries ID information specific to that interface unit 3 or routing information about that interface unit 3, the cell converting/copying section 56 affixes all routing information to the local exclusive cell and copies the resultant local exclusive cell to provide a plurality of local exclusive cells having the same contents. Accordingly, the interface unit 3 which has received this local exclusive cell can automatically identify and specify the interface unit 3 that has sent that local exclusive cell.

Figure 9:
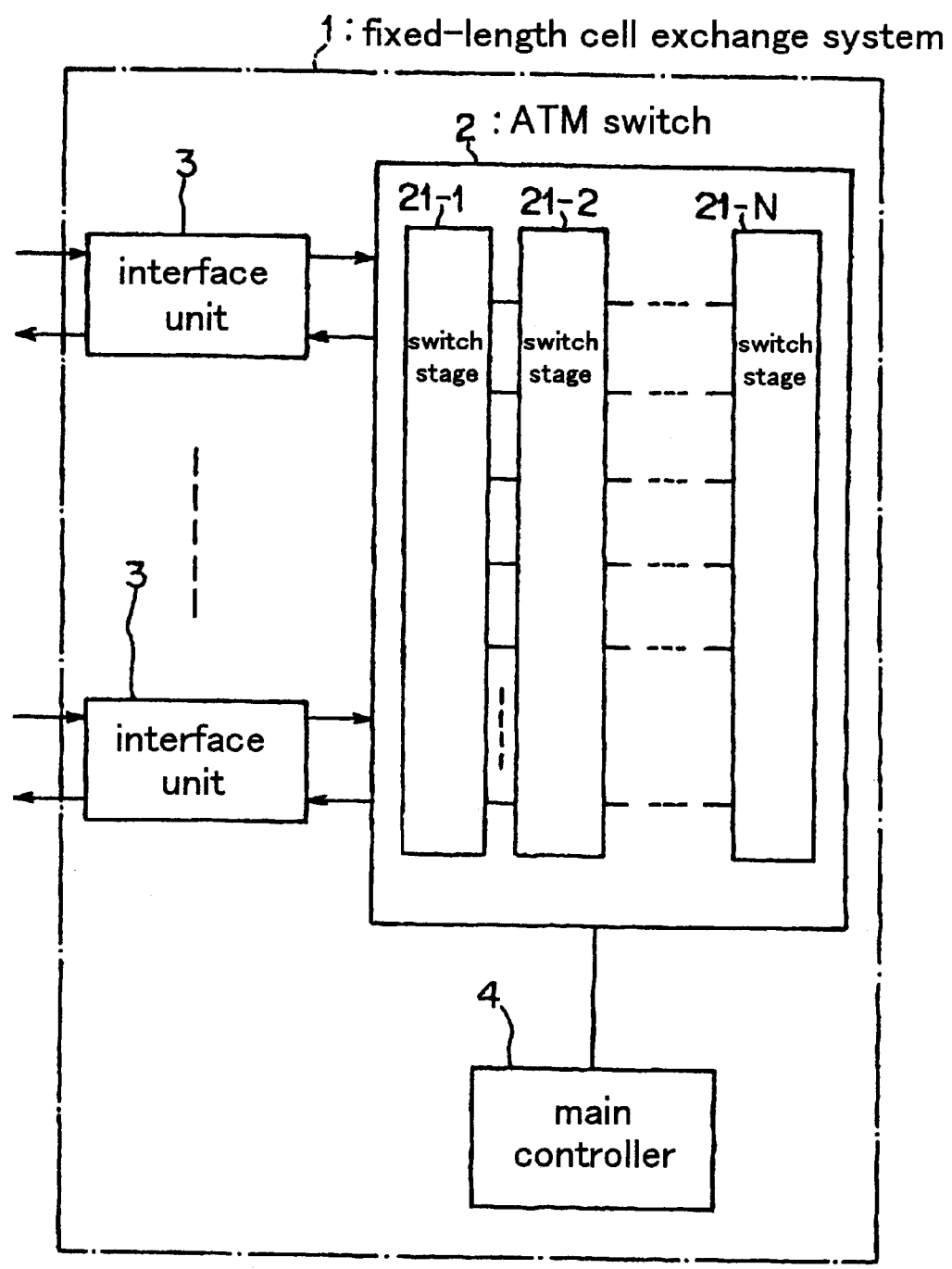
FIG. 9 is a block diagram illustrating the principle of the eighth embodiment of this invention.

In the block diagram in FIG. 9 showing the principle of the eighth embodiment of this invention, reference numeral "1" also denotes a fixed-length cell exchange system which handles fixedlength cells. This fixed-length cell exchange system 1 comprises an ATM switch 2 which has three or more switch stages 21-1 to 21-N (N being a natural number equal to or greater than 3), a call control processor 4 for this ATM switch 2, and a plurality of interface sections (interface units) 3 connected to the input and output sections of this ATM switch 2.

According to a failure attending method of this invention as adapted to the fixed-length cell exchange system 1, when a failure occurs in any of the intermediate switch stages 21-2 to 21-(N−1) in the ATM switch 2, the call control processor 4 sends the routing information about the failed one of the intermediate switch stages 21-2 to 21-(N−1) to all the implemented interface units 3. Each interface unit 3 having received this routing information sends an alarm cell to the path which matches with the informed routing information.

When the failed switch stage in the intermediate switch stages 21-2 to 21-(N−1) is restored, the call control processor 4 informs all the implemented interface units 3 of the restoration, and each informed interface unit 3 stops sending the alarm cell.

As mentioned above, any interface unit 3 which has received the routing information about the failed switch stage in the intermediate switch stages 21-2 to 21-(N−1) sends an alarm cell to the path which matches with the informed routing information. At the same time, the charge counters stop counting.

When the failed one of the intermediate switch stages 21-2 to 21-(N−1) is restored, the call control processor 4 informs all the implemented interface units 3 of the restoration, and the informed interface units 3 stop sending alarm cells. At the same time, the charge counters restart counting.

Figure 10:
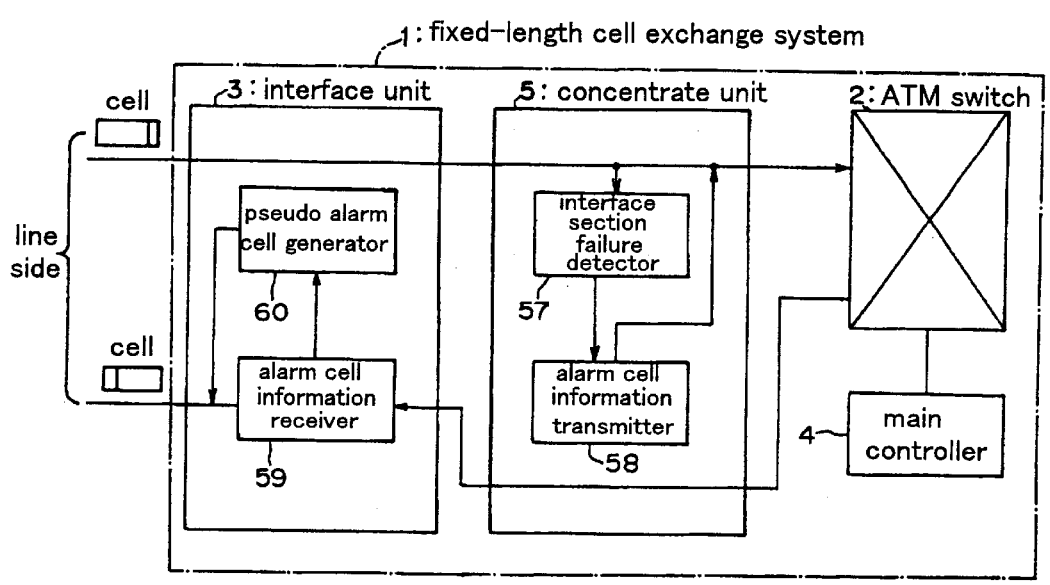
FIG. 10 is a block diagram showing the principle of the ninth embodiment of this invention.

FIG. 10 is a block diagram showing the principle of the ninth embodiment of this invention. In the ninth embodiment in FIG. 10, a fixed-length cell exchange system 1 which handles fixed-length cells comprises an ATM switch 2, a call control processor 4 for this ATM switch 2, a plurality of interface sections (interface units) 3 connected to the input and output sections of this ATM switch 2, and a plurality of concentration sections (concentrators) 5 which concentrate the input/output information of the associated interface units 3.

Each concentration section 5 includes an interface failure detector 57 and an alarm cell information transmitter 58, and each interface unit 3 includes an alarm cell information receiver 59 and a pseudo alarm cell generator 60.

In each concentration section 5, the interface failure detector 57 detects a failure occurring in the associated interface unit 3, and the alarm cell information transmitter 58 sends a cell affixed with information indicating that it is an alarm cell to the ATM switch 2 when the interface failure detector 57 detects a failure in the associated interface unit 3.

The alarm cell information receiver 59 in the interface unit 3 receives the cell affixed with alarm-cell indicating information. Upon reception of the cell affixed with the alarm-cell indicating information, the pseudo alarm cell generator 60 generates a pseudo alarm cell and sends it to the line side.

Each interface unit 3 may be designed to include charge counters and a charge counter controller which causes the charge counters to stop counting when receiving the cell affixed with the alarm-cell indicating information.

In the thus constituted fixed-length cell exchange system 1, when a failure in one of the interface units 3 is detected by the interface failure detector 57 in the associated concentration section 5, the concentration section 5 (alarm cell information transmitter 58) sends a cell affixed with the alarm-cell indicating information to the ATM switch 2. When the cell affixed with the alarm-cell indicating information is received by the alarm cell information receivers 59 in the other interface units 3, the pseudo alarm cell generators 60 in the other interface units 3 generate pseudo alarm cells and send them to the line side. At this time, the charge counter controller may disable the counting of the charge counters.

Figure 11:
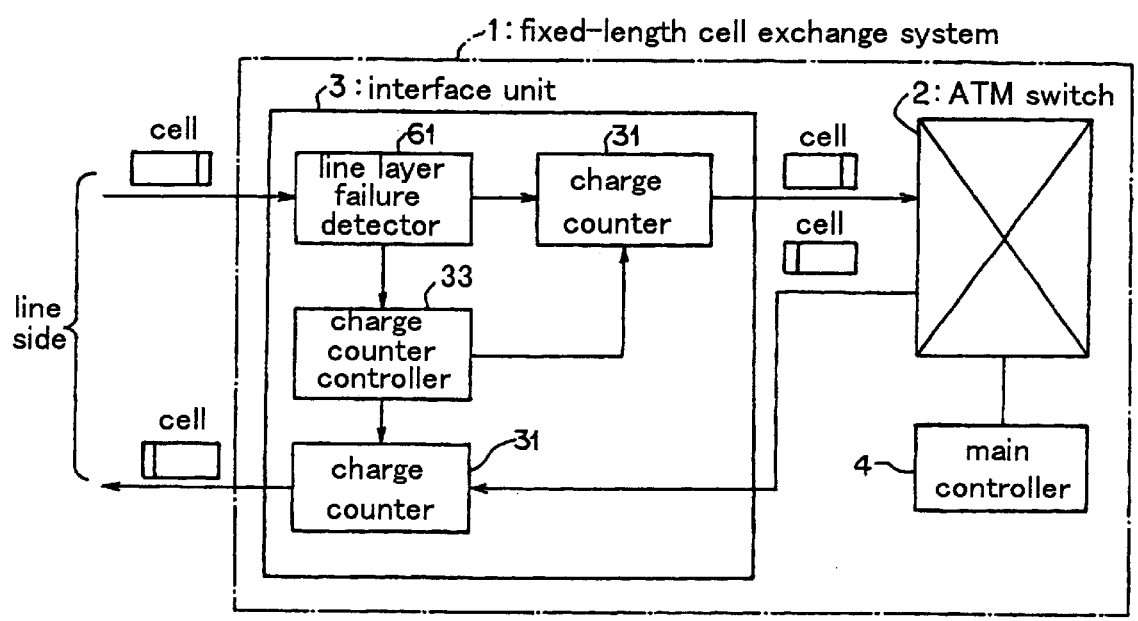
FIG. 11 is a block diagram illustrating the principle of the tenth embodiment of this invention.

FIG. 11 is a block diagram showing the principle of the tenth embodiment of this invention. In FIG. 11, a fixed-length cell exchange system 1 which handles fixed-length cells also comprises an ATM switch 2 and a plurality of interface sections (interface units) 3 connected to the input and output sections of this ATM switch 2. Each interface unit 3 includes charge counters 31, a line layer failure detector 61 and a charge counter controller 33. Reference numeral "4" denotes a call control processor for the ATM switch 2.

The line layer failure detector 61 detects a failure in a line layer. The charge counter controller 33 disables the counting of the charge counters 31 for all the connections when the line layer failure detector 61 detects a line layer failure.

When the line layer failure detector 61 detects the restoration of the failed line layer, the charge counter controller 33 restarts the counting of the charge counters 31.

In the thus constituted fixed-length cell exchange system 1, when the line layer failure detector 61 detects a failure in a line layer, the charge counter controller 33 in the associated interface unit 3 disables the counting of the charge counters 31 for all the connections.

When the line layer failure detector 61 detects the restoration of the failed line layer, the charge counter controller 33 in the associated interface unit 3 restarts the counting of the charge counters 31.

Based on the above-described principles of those embodiments, several modes of an ATM exchange to which this invention is adapted will be described below.

(a) First Mode

Figure 12:
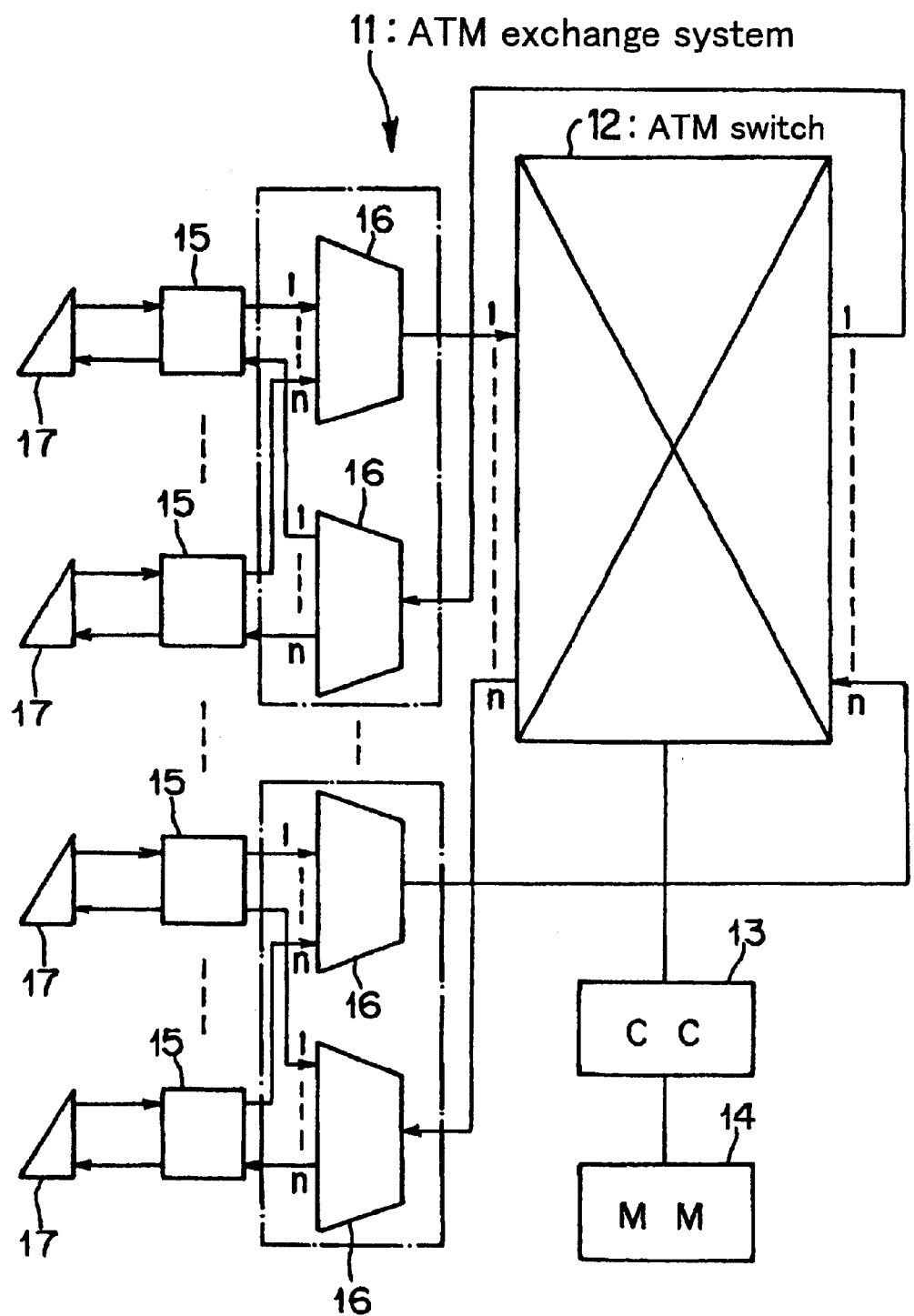
FIG. 12 is a block diagram illustrating an ATM exchange system to which this invention is adapted.

FIG. 12 is a block diagram illustrating the structure of an ATM exchange system according to the first mode of this invention. As shown in FIG. 12, the ATM exchange system 11 comprises an ATM switch 12, a main controller (CC) 13, a main memory 14, a plurality of interface units (interface sections) 15, connected to the input and output sections of the ATM switch 12, and a plurality of concentration sections (concentrators) 16 which concentrate input/output information of the associated interface units 15.

Reference numeral "17" shows an end terminal like a subscriber terminal which is accommodated in the associated interface unit 15 via lines.

Figure 13:
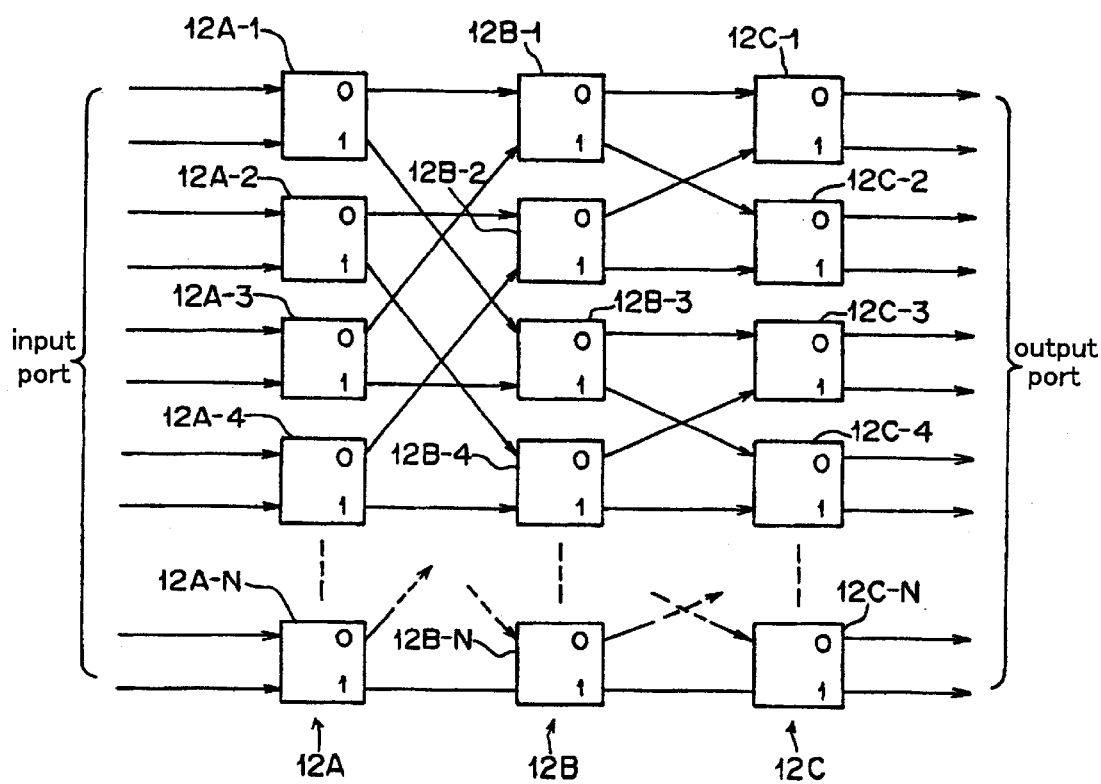
FIG. 13 is a block diagram showing an ATM exchange (switch) in the ATM exchange system shown in FIG. 12.

The ATM switch (exchange switch section) 12, which automatically selects a cell transfer path in accordance with tag information (routing information like the address of the transfer destination) set in the header of the input ATM cell, is a so-called multistage self-routing (MSSR) switch, for example, as shown in FIG. 13 in this mode. This ATM switch 12 has three switch stages 12A to 12C respectively consisting of switching elements 12A-1 to 12A-N, 12B-1 to 12B-N and 12C-1 to 12C-N (N being a natural number).

The individual switching elements 12A-1 to 12A-N, 12B-1 to 12B-N and 12C-1 to 12C-N change over the output paths of data (cells) in accordance with the input data of "1" or "0." As those switching elements 12A-1 to 12A-N, 12B-1 to 12B-N and 12C-1 to 12C-N sequentially read tag information set in a binary form in the header of the input cell bit on the bit-by-bit basis and repeat the alternative selection of either "1" or "0" to automatically select the cell transfer path.

In this mode, as will be discussed later, to inform each interface unit 15 of the tag information about the intermediate (second) switch stage 12B when a failure occurs in the intermediate switch stage 12B in the ATM switch 12, a link is established between the first switch stage 12A and the second switch stage 12B in such a way that the tag information about the intermediate switch stage 12B matches with the line number of this switch stage 12B.

The aforementioned main controller (CC) 13 controls the operations which are performed in the individual sections provided in the ATM exchange system 11 including the ATM switch 12, and the main memory 14 stores software so that the main controller 13 can execute the software to control all the operations performed in the individual sections.

Each interface unit 15 generates an AIS cell (alarm cell) and stops charging for a cell passing through the associated connection when some failure occurs in a line layer, an ATM layer which performs cell multiplex/exchange, any one of the other interface units 15 or the ATM switch 12.

Each concentrator 16, which normally affixes tag information indicative of the transfer path of the input cell to this cell, is designed in this mode to be able to detect a failure occurring in one of the interface units 15 and send an AIS cell to every connection.

Figure 14:
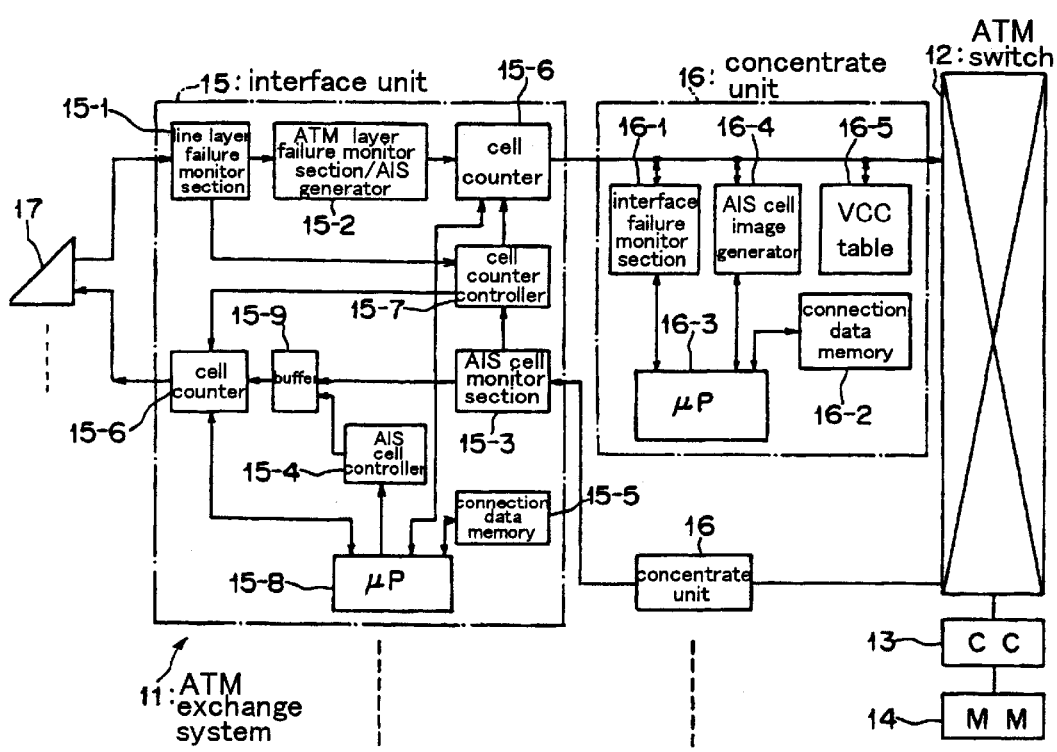
FIG. 14 is a block diagram depicting an interface unit and a concentrator according to the first mode in the ATM exchange system shown in FIG. 12.

FIG. 14 is a block diagram showing the structures of the aforementioned interface unit 15 and concentrator 16. As shown in FIG. 14, each interface unit 15 comprises a line layer failure monitor section 15-1, an ATM layer failure monitor section/AIS generator 15-2, an AIS cell monitor section 15-3, an AIS cell controller 15-4, a connection data memory 15-5, two cell counters 15-6 one on the ATM switch (12) side and the other on the end terminal (17) side, a cell counter controller 15-7, a microprocessor ($\mu$P) 15-8 and a buffer 15-9.

Each concentrator 16 includes an interface failure monitor section 16-1, a connection data memory 16-2, a microprocessor (P) 16-3, an AIS cell image generator 16-4, and a virtual channel connection (VCC) table 16-5.

The line layer failure monitor section (line layer failure detector) 15-1 in the interface unit 15 detects a failure in an implemented line layer. The ATM layer failure monitor section/AIS generator 15-2 monitors (detects) a failure in an ATM layer which deals with the multiplexing and exchange of an ATM cell and generates an AIS cell (alarm cell) upon detection of a failure to inform the downstream stations (the interface unit 15, concentrator 16, end terminal 17, etc.) which are the cell's transfer destinations. This AIS cell is sent to the individual connections (VPCs/VCCs) of a virtual path (VP) and virtual channel (VC) on the associated line.

The AIS cell monitor section (alarm cell detector) 15-3 detects the AIS cell which is to be received when a line layer failure is detected by the line layer failure monitor section 15-1 or when an ATM layer failure is detected by the ATM layer failure monitor section/AIS generator 15-2. The AIS cell controller (alarm cell transmitter) 15-4 transmits an AIS cell to the connections (VPCs/VCCs) for the interface unit 15 whose failure has been detected by the microprocessor 15-8 as will be described later (such an interface unit will be called "failed interface unit" whenever convenient).

When informed of the restoration of the failed interface unit 15 by the call control processor 4 for the ATM switch 12, this AIS cell controller 15-4 stops sending the AIS cell.

Figure 15:
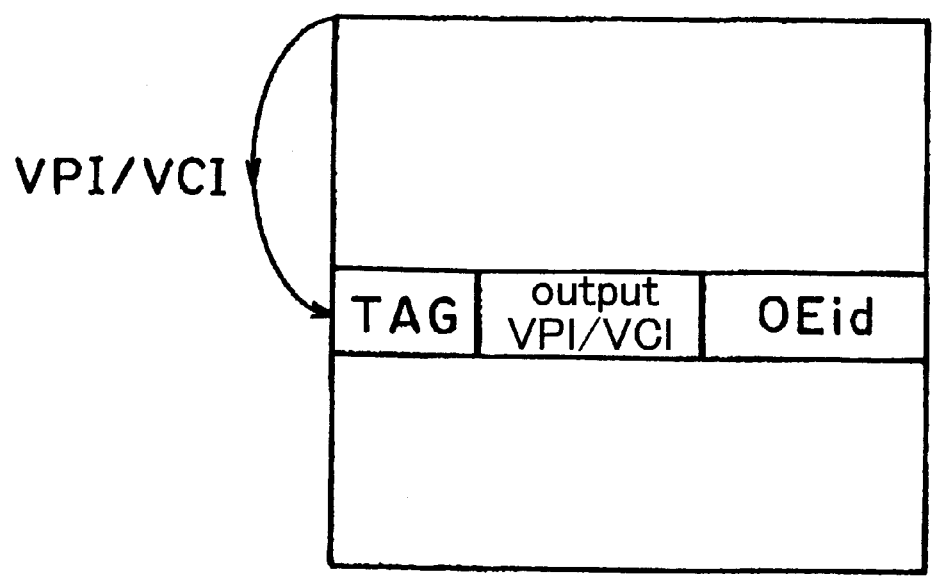
FIG. 15 is a diagram exemplifying the format of connection data which is used in the ATM exchange system shown in FIG. 12.

The connection data memory (the ID information memory and routing information memory) 15-5 stores various kinds of connection data, such as specific ID (OEid) information to opposed units, tag information thereabout and tag information about the intermediate switch stage 12B (the individual switching elements 12B-1 to 12B-N) in the ATM switch 12. The connection data has such a format that tag information (TAG), a virtual path identifier (VPI) and virtual channel identifier (VCI) on the cell's output side, ID (OEid) specific to each interface unit 15 and the like are stored for each VPI and VCI, as shown in FIG. 15.

The microprocessor (the ID information receiver, routing information receiver and path detector) 15-8 receives the receives the ID information or routing information of an OE for the failed interface unit 15 from the main controller 13. At this time, the microprocessor 15-8 searches the connection data memory 15-5 to detect the path which matches with the received OEid or tag information for the failed interface unit 15.

Further each cell counter (charge counter) 15-6 counts the number of cells to be sent to the ATM switch 12 and the end terminal 17 to acquire charge information for charging the money corresponding to the number as the line usage charge. The cell counter controller (equivalent to the charge counter controller 33 which has already been discussed with reference to FIGS. 2 to 7) disables the counting of the cell counter 15-6 in the following cases:

(1) When a line layer failure is detected by the line layer failure monitor section 15-1.

(2) When an ATM layer failure is detected by the ATM layer failure monitor section 15-2.

(3) When an AIS cell is detected by the AIS cell monitor section 15-3.

It is to be noted that the counting of the cell counter 15-6 is disabled for every connection (VPC/VCC) in the case (1) and for the associated connections (VPCs/VCCs) in the cases (2) and (3).

This cell counter controller 15-7 causes the cell counter 15-6 to restart counting in the following cases:

(4) When the restoration of the failed line layer is detected by the line layer failure monitor section 15-1.

(5) When the disabling of the transmission of an AIS cell is detected by the AIS cell monitor section 15-3.

(6) When the transmission of an AIS cell from the AIS cell controller 15-4 is stopped.

The buffer 15-9 temporarily retains input cells. A cell input through the AIS cell monitor section 15-3 in the normal state and an AIS cell which is produced by the AIS cell controller 15-4 upon occurrence of a failure are selectively sent to the line side according to the normal state or the failure-occurring state.

The interface failure monitor section (failure detector) 16-1 in the concentrator 16 detects a failure in the associated interface unit 15, and the connection data memory 16-2 stores data of connections made to the interface unit 15 in the same format as illustrated in FIG. 14.

When the interface failure monitor section 16-1 detects a failure in the interface unit 15, the microprocessor (connection information extractor) 16-3 searches connection data stored in the connection data memory 16-2 to extract the connection data about every connection established to the failed interface unit 15. The AIS cell image generator (alarm cell transmitter) 16-4 writes a predetermined bit image in the payload type identifier (PTI) and the payload portion of every input cell, and inputs the resultant data into the VCC table 16-5. Accordingly, the AIS cell is sent to every connection (VPC/VCC) extracted by the microprocessor 16-3 as the connection information extractor.

Note that the AIS cell image generator 16-4 stops sending an AIS cell when informed of the restoration of the failed interface unit 15 by the main controller 13.

A description will now be given of how to cope with a failure when occurred in the thus constituted ATM exchange system 11.

(a1) When an ATM layer failure occurs:

When a failure occurs in the ATM layer which performs the multiplexing and exchange of an ATM cell in the ATM exchange system 11, normally, an AIS cell is sent to the downstream side (ATM switch side) of the interface unit 15 which has detected this failure. In the interface unit 15 whose cell counter 15-6 has received this AIS cell, the AIS cell monitor section 15-3 detects VPI/VCI in the AIS cell, which is reported to the cell counter controller 15-7.

The cell counter controller 15-7 disables the counting of each cell counter for the connection (VPC/VCC) associated with the reported VPI/VCI. When the failed ATM layer is restored later, the disabling of the transmission of the AIS cell is detected by the AIS cell monitor section 15-3. At this time, the cell counter controller 15-7 in the interface unit 15 restarts the disabled counting of the cell counter 15-6 for the connection (VPC/VCC).

According to the ATM exchange system 11 in this mode, when the interface unit 15 receives an AIS cell issued upon occurrence of an ATM layer failure, the interface unit 15 causes the cell counter controller 15-7 to disable the counting of the cell counter 15-6 for the associated connection (VPC/VCC) until the failure is cleared and the transmission of the AIS cell is stopped. It is therefore possible to surely prevent an unnecessary charge when a failure occurs and always make an accurate charge.

(a2) When a line layer failure occurs:

A description will now be given of how to deal with a line layer failure in this ATM exchange system 11.

When a failure occurs in a line layer between one interface unit 15 and the associated end terminal 17, for example, the line layer failure monitor section 15-1 in the interface unit 15 retaining that line detects the occurrence of the failure. At this time, the line layer failure monitor section 15-1 sends a request for the transmission of an AIS cell to the ATM layer failure monitor section/AIS generator 15-2 with every connection (every VPC/VCC) designated, and sends the cell counter 15-6 an instruction to stop charging for all the cells.

Then, the ATM layer failure monitor section/AIS generator 15-2 generates an AIS cell for VP/VC and sends it to the ATM switch 12 with respect to every connections (VCC/VPC) which are virtually connected to the failed line. Accordingly, the cell counter controller 15-7 disables the counting of the cell counter 15-6 for every connection (VCC/VPC).

In any other interface unit 15 which has received the AIS cell sent from the ATM layer failure monitor section/AIS generator 15-2 in the above-described manner, its AIS cell monitor section 15-3 detects the AIS cell as mentioned in the paragraph (1). Consequently, the cell counter controller 15-7 disables the counting of the cell counter 15-6 for every connection (VCC/VPC) in that interface unit 15.

That is, the ATM exchange system 11 of this mode is designed in such a way that when a line layer failure occurs, the counting of every cell counter 15-6 is disabled.

When the restoration of the failed line layer is detected later by the line layer failure monitor section 15-1 in the interface unit 15, the transmission of the AIS cell from the ATM layer failure monitor section/AIS generator 15-2 is stopped and the cell counter controller 15-7 restarts the disabled counting of the cell counter 15-6 for every connection (VPC/VCC).

According to the ATM exchange system 11 (interface unit 150 in this mode, as apparent from the above, when any interface unit 15 detects a line layer failure, this interface unit 15 disables the counting of the cell counter 15-6 for every connection (VCC/VPC) until the failed line layer is restored. In this case, it is also possible to surely prevent an unnecessary charge when a failure occurs and always make an accurate charge.

(a3) When a failure occurs in the interface unit 15:

A description will now be given of how to deal with a failure occurring in any interface unit 15 in this ATM exchange system 11, with reference to the flowcharts (steps S1 to S12) illustrated in FIGS. 16 and 17.

First, specific ID information (OEid) is given for each interface unit 15 in the entire system by a maintenance person. To connect a path between puts the individual interface units 15 (to establish a VCC), the main controller 13 informs path information (input VPI/VCI, output VPI/VCI, tag information, etc.) and OEid about the interface unit 15 on that path or tag information (TAG) indicating the transfer path to the opposed interface unit 15. The interface unit 15 having received those information puts the OEid and TAG in a predetermined area in the connection data in the connection data memory 15-5, and affixes the OEid for the opposed unit to the path information to establish a path.

When some failure occurs in one of the interface units 15 later, the main controller 13 informs the other interface units 15 than the failed interface unit 15 of the OEid or TAG about the failed interface unit 15.

Figure 16:
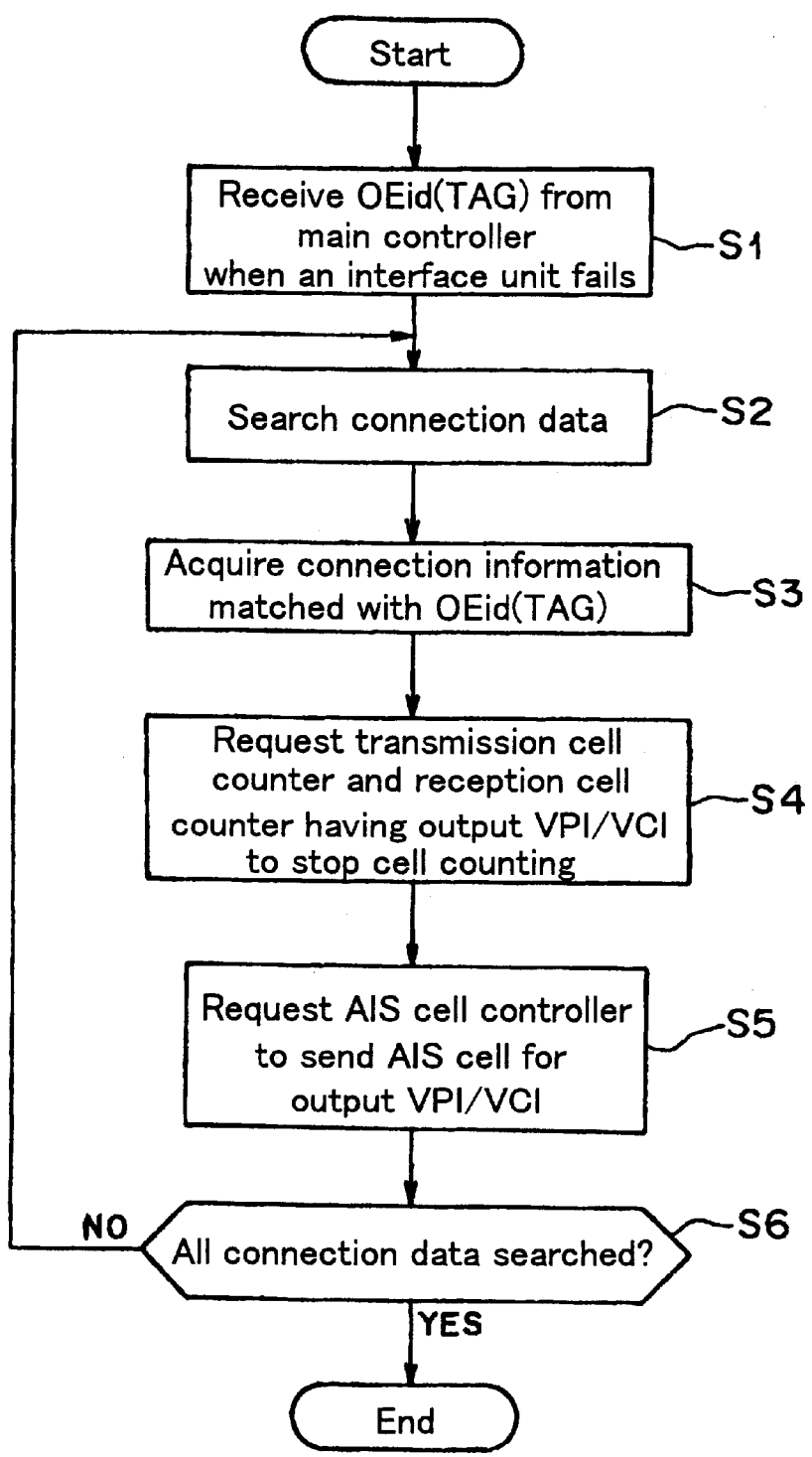
FIG. 16 is a first flowchart for explaining how to cope with a failure occurred in the ATM exchange system shown in FIG. 12.

As shown in FIG. 16, each informed interface unit 15 receives this information at the microprocessor 15-8 as ID information receiver (step S1). This interface unit 15 causes the microprocessor 15-8 as the path detector to search the connection data stored in the connection data memory 15-5 (step S2).

The microprocessor 15-8 extracts the connection data corresponding to the OEid or TAG informed by the main controller 13 to detect the path which matches with the OEid or TAG (step S3).

Then, the microprocessor 15-8 disables the counting of both cell counters 15-6 for transmission and reception which have the VPI/VCI of the associated connection (cell's output VPC/VCC). The microprocessor 15-8 also informs the AIS cell controller 15-4 and the cell counter controller 15-7 of the output VPI/VCI in order to cause the AIS cell controller 15-4 to send an AIS cell (steps S4 and S5).

The microprocessor 15-8 determines if all the connection data in the connection data memory 15-5 have been searched thoroughly (step S6). When not all the connection data in the connection data memory 15-5 have been searched (when NO in step S6), the sequence of processes in steps S2 to S5 is repeated until such thorough search is completed. When all the connection data in the connection data memory 15-5 have been searched (when YES in step S6), the microprocessor 15-8 terminates the subsequent process.

Thereafter, the AIS cell controller 15-4 sends an AIS cell to the line side with respect to the connection detected in the above manner by the microprocessor 15-8 to inform the opposed units of the occurrence of a failure, and the cell counter controller 15-7 disables the counting of the cell counter 15-6 which is associated with the connection detected by the microprocessor 15-8.

When the failed interface unit 15 is restored, the main controller 13 informs the other interface units 15 than the failed interface unit 15 of the restoration by OEid or TAG.

Figure 17:
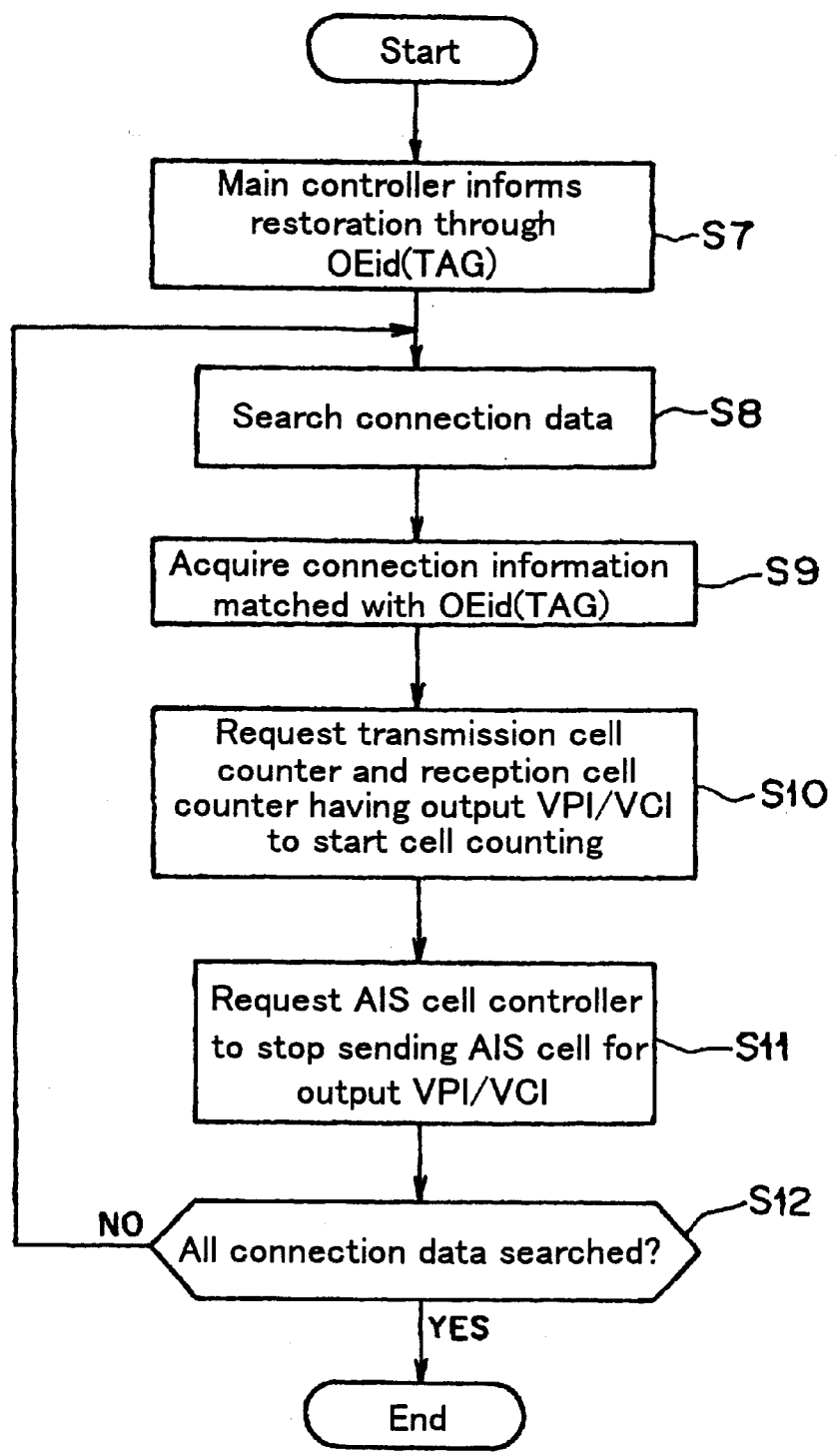
FIG. 17 is a second flowchart for explaining how to cope with a failure occurred in the ATM exchange system shown in FIG. 12.

When the interface units 15 are informed of such an event (step S7), the microprocessor 15-8 in each informed interface unit 15 searches the connection data stored in the connection data memory 15-5 (step S8), as illustrated in FIG. 17. The microprocessor 15-8 extracts the connection data corresponding to the OEid or TAG informed by the main controller 13 and detects the path which matches with the OEid or TAG (step S9).

The microprocessor 15-8 then starts the counting of both cell counters 15-6 for transmission and reception which have the VPI/VCI of the associated connection (cell's output VPC/VCC), and also informs the AIS cell controller 15-4 and the cell counter controller 15-7 of the output VPI/VCI in order to disable the transmission of the AIS cell from the AIS cell controller 15-4 (steps S10 and S11).

The microprocessor 15-8 determines if all the connection data have been searched thoroughly in the connection data memory 15-5 (step S12). When thorough search of the connection data has not been completed (when NO in step S12), the sequence of processes in steps S7 to S11 is repeated until such thorough search is completed. When all the connection data have been searched (when YES in step S12), the microprocessor 15-8 terminates the subsequent process.

Consequently, the transmission of the AIS cell from the AIS cell controller 15-4 is disabled and the counting of the cell counter 15-6 is restarted by the cell counter controller 15-7.

When a failure occurs in one of the interface units 15 in the ATM exchange system 11 in this mode, as discussed above, the other interface units 15 than the failed interface unit 15 keep sending AIS cells based on the specific ID information (OEid) or tag information (TAG) about the failed interface unit 15 until the failed interface unit 15 is restored. It is therefore possible to reliably detect any failure in some of the interface units 15 and to properly cope with the failure.

When the AIS cells are sent from the other interface units 15 than the failed interface unit 15, as mentioned above, each interface unit 15 (including the failed interface unit 15) disables the counting of the cell counter 15-6 for the associated connection (VPI/VCI) until the failed interface unit 15 is restored and the transmission of the AIS cell is stopped. In this case too, it is possible to surely prevent an unnecessary charge when a failure occurs and always make an accurate charge.

As mentioned above, when a failure occurs in any interface unit 15, that failed interface unit 15 cannot send an AIS cell. In this case, however, the concentrator 16 may send an AIS cell instead.

The following describes how to attend a failure occurring in such an ATM exchange system 11.

When a failure occurs in one of the interface units 15 later, this failure is detected by the interface failure monitor section 16-1 in the concentrator 16, which concentrates the input/output information of that interface unit 15.

Then, the microprocessor 16-3 (as the connection information extractor) in this interface failure monitor section 16-1 searches connection data (see FIG. 15) stored in the connection data memory 16-2 to extract data (VPI/VCI) about every connection (VPC/VCC) established to the failed interface unit 15. This data is sent to the AIS cell image generator 16-4.

The AIS cell image generator 16-4 writes a predetermined bit image in the payload type identifier and the payload portion of every input cell, based on the VPI/VCI sent from the microprocessor 16-3. The resultant data is put in the VCC table 16-5, causing the AIS cell to be sent to every connection (VPC/VCC) extracted by the microprocessor 16-3.

In the failed interface unit 15, the cell counter controller 15-7 disables the counting of the cell counter 15-6 in this case too.

When the failed interface unit 15 is restored, the main controller 13 informs the other interface units 15 than the failed interface unit 15 of the restoration. The microprocessor 15-8 in any informed interface unit 15 disables the transmission of the AIS cell from the AIS cell controller 15-4 while the cell counter controller 15-7 in the restored interface unit 15 restarts the counting of the cell counter 15-6.

When a failure in any interface unit 15 is detected by the associated concentrator 16 in the ATM exchange system 11 in this mode, this concentrator 16 keeps sending an AIS cell to every connection (VPC/VCC) until the failed interface unit 15 is restored. Even when a failure occurs in the interface unit 15 which should send an AIS cell, therefore, the associated concentrator 16 can send an AIS cell to inform every connection of the occurrence of the failure. It is thus possible to properly cope with a failure in any interface unit 15.

In the failed interface unit 15, the counting of the cell counter 15-6 is disabled until the failed interface unit 15 is restored and the transmission of the AIS cell is stopped. In this case too, it is possible to surely prevent an unnecessary charge when a failure occurs and always make an accurate charge.

(a4) When a failure occurs in the ATM switch 12:

The following describes a failure attending method for the ATM exchange system 11 when a failure occurs in the ATM switch 12.

Assume that a failure has occurred in the switching element 12B-2 which constitutes the second switch stage 12B in the ATM switch 12 shown in FIG. 13. The main controller 13 sends the tag information about the failed switching element 12B-2 of the intermediate switch stage 12B to all the implemented interface units 15.

In each interface unit 15 having receiving the tag information, the microprocessor 15-8 searches the connection data memory 15-5 to extract the VPI/VCI for the path which matches with the informed tag information as has been explained earlier with reference to FIG. 16 (as in the case where a failure occurs in the interface unit 15). The AfS cell controller 15-4 sends an AIS cell to the path which matches with the extracted VPI/VCI. At the same time, the cell counter controller 15-7 disables the counting of each cell counter 15-6 for the connection (VPC/VCC) that has the VPI/VCI.

When the failure in the intermediate switch stage 12B (switching element 12B-2) in the ATM switch 12 is cleared, the main controller 13 informs all the implemented interface units 15 of the restoration by means of the tag information. In the informed interface unit 15, the microprocessor 15-8 extracts the VPI/VCI of the path which matches with the informed tag information from the connection data memory 15-8 in the same process as has already been discussed with reference to FIG. 16. This VPI/VCI is sent to the AIS cell controller 15-4 and the cell counter controller 15-7.

Consequently, the AIS cell controller 15-4 disables the transmission of the AIS cell to the path with the informed VPI/VCI. The cell counter controller 15-7 restarts the counting of the cell counter 15-6 for the connection (VPC/VCC) having the VPI/VCI.

According to the ATM exchange system 11 in this mode, when a failure occurs in the second (intermediate) switch stage 12B (switching element 12B-2) in the ATM switch 12 which has three switch stages 12A to 12C, the main controller 13 sends the tag information about the failed switch stage 12B (switching element 12B-2) to all the implemented interface units 15. In each informed interface unit 15, the AIS cell is sent to the path which matches with the informed tag information. Even if a failure occurs in the ATM switch 12, therefore, this failure in the ATM switch 12 can reliably recognized by sending an AIS cell from each interface unit 15, thus always ensuring the proper attendance to such a failure.

In this case too, the counting of the cell counter 15-6 in each interface unit 15 is disabled until the transmission of the AIS cell is stopped and the failed switch stage 12B is restored. It is therefore possible to surely prevent an unnecessary charge when a failure occurs and always make an accurate charge.

The interface unit 15 shown in FIG. 14 may be so designed as to comprise only the line layer failure monitor section 15-1, the cell counter 15-6 and the cell counter controller 15-7 or only the AIS cell monitor section 15-3, the cell counter 15-6 and the cell counter controller 15-7, so that when a line layer failure occurs or when an AIS cell is received, the counting of the cell counter 15-6 is disabled. Alternatively, the interface unit 15 may be so designed as to comprise only the AIS cell controller 15-4, the connection data memory 15-5, the cell counter 15-6, the cell counter controller 15-7 and the microprocessor 15-8, so that when a failure occurs in any other interface unit 15, an AIS cell is sent to the line side and the counting of the cell counter 15-6 is disabled.

(b) Second Mode

Figure 18:
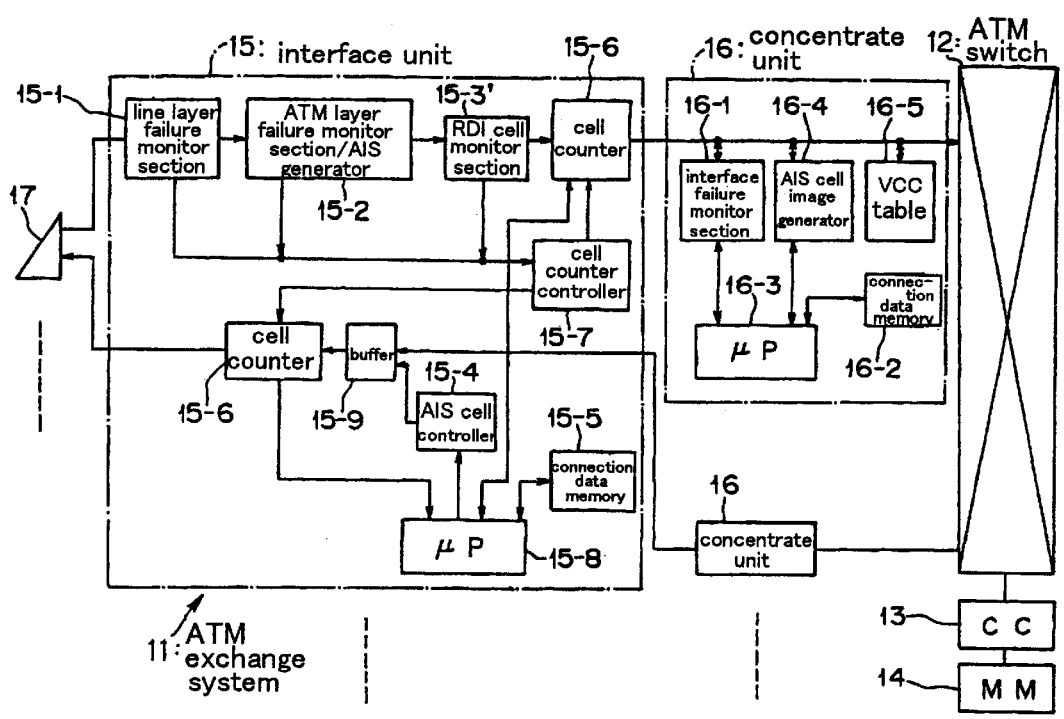
FIG. 18 is a block diagram illustrating an interface unit and a concentrator according to the second mode in the ATM exchange system shown in FIG. 12.

FIG. 18 is a block diagram showing the structure of an ATM exchange system according to the second mode of this invention. In FIG. 18, same reference numerals as given in FIG. 14 indicate the corresponding components in FIG. 14. This mode differs from the first mode shown in FIG. 14 in that the interface unit 15 has an RDI cell monitor section 15-3' instead of the AIS cell monitor section 15-3.

The RDI cell monitor section 15-3' (equivalent to the remote reception failure cell detector 34; see FIG. 3) detects an RDI cell which is sent from the end terminal 17 in response to an AIS cell when a failure occurs in the ATM layer that performs cell multiplexing and conversion (when the AIS cell is transmitted).

The cell counter controller 15-7 in this mode also disables the counting of the cell counter 15-6 for the associated connection (VPC/VCC) based on the VPI/VCI in an RDI cell when this RDI cell is detected by the RDI cell monitor section 15-3'. When the disabled transmission of the RDI cell is detected by the RDI cell monitor section 15-3', the counting of the cell counter 15-6 for the associated connection is restarted.

With this structure, the ATM exchange system 11 is capable of permitting the cell counter controller 15-7 to disable the counting of the cell counter 15-6 for the associated connection (VPC/VCC) based on the VPI/VCI in an RDI cell, which is sent out from the end terminal 17 upon occurrence of an ATM layer failure, even when this RDI cell is received by the interface unit 15 and is detected by the RDI cell monitor section 15-3', in addition to the execution of the above-described processes in the first mode.

When the transmission of the AIS cell is disabled due to the restoration of the failed ATM layer and when the disabled transmission of the RDI cell is detected by the RDI cell monitor section 15-3', the cell counter controller 15-7 in the interface unit 15 restarts the counting of the cell counter 15-6 for the associated connection.

In other words, according to the ATM exchange system 11 (interface unit 15) in this mode, even when any interface unit 15 receives an RDI cell, which is sent out from the end terminal 17 upon occurrence of an ATM layer failure, this interface unit 15 disables the counting of the cell counter 15-6 until the failed ATM layer is restored and the transmission of the AIS cell is stopped. In this case too, it is possible to surely prevent an unnecessary charge when a failure occurs and always make an accurate charge.

The interface unit 15 shown in FIG. 18, like the one in the first mode, may be so designed as to comprise only the RDI cell monitor section 15-3', the cell counter controller 15-7 and the cell counter 15-6, so that when an RDI cell is detected, the counting of the cell counter 15-6 is disabled.

(c) Third Mode

Figure 19:
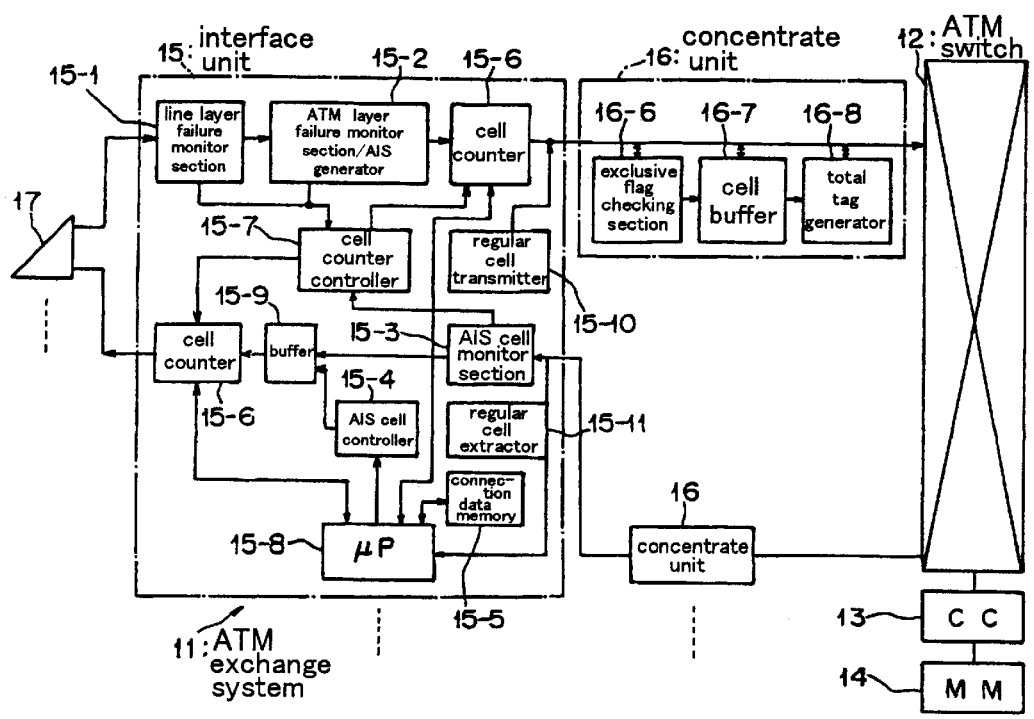
FIG. 19 is a block diagram illustrating an interface unit and a concentrator according to the third mode in the ATM exchange system shown in FIG. 12.

FIG. 19 is a block diagram showing the structure of an ATM exchange system according to the third mode of this invention. In FIG. 19, same reference numerals as given in FIG. 14 also indicate the corresponding components in FIG. 14.

In this mode, the interface unit 15 comprises a regular cell transmitter 15-10 and a regular cell extractor 15-11 in addition to the components shown in FIG. 14. The concentrator 16 comprises an exclusive flag checking section 16-6, a cell buffer 16-7 and a total tag generator 16-8.

The regular cell transmitter (active cell transmitter) 15-10 in the interface unit 15 regularly sends a cell (active cell) indicating that the local interface unit is properly operating to the other interface units 15 in a predetermined period (e.g., every 1 sec) via a PVC (Permanent Virtual Channel) established between the other interface units 15. The regular cell extractor (active cell monitor section) 15-1 monitors an active cell from any interface unit 15 other than the local interface unit 15.

In this mode which also performs the individual processes described above referring to FIG. 14, the AIS cell controller (alarm cell transmitter) 15-4 sends an AIS cell to all the connected paths when the regular cell extractor 15-11 detects that an active cell is not received at a given interval. When the regular cell extractor 15-11 detects that an active cell is not received at a given interval, the cell counter controller 15-7 (charge counter controller 33; see FIG. 2, for example) disables the counting of the cell counter 15-6.

When the regular cell extractor 15-11 detects that an active cell is received again at a given interval after the transmission of the AIS cell, the AIS cell controller 15-4 disables the transmission of the AIS cell. When the AIS cell controller 15-4 disables the transmission of the AIS cell, the cell counter controller 15-7 restart the counting of the cell counter 15-6.

In the concentrator 16, the exclusive flag checking section (exclusive cell catching section) 16-6 checks the exclusive flag of a cell sent from the interface unit 15 whose input/output information it concentrates, and catches a local exclusive cell having the OEid (specific ID information to each interface unit 15) or tag information (routing information).

Figure 20:
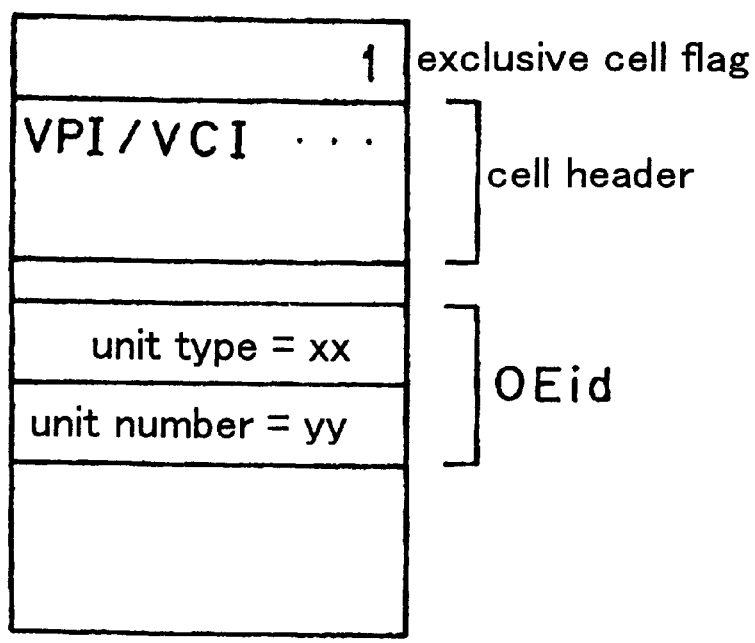
FIG. 20 is a diagram exemplifying the format of an exclusive cell which is used in the mode in FIG. 19.

This local exclusive cell is produced in the interface unit 15 by adding a storage area for local use only to the cell header and setting an exclusive cell flag (e.g., "1" for the exclusive cell and "0" for normal cell) in that area. The format has individual storage areas for the exclusive cell flag, cell header (set data: VPI, VCI or the like), and OEid (unit type: xx, unit number: yy) as shown in FIG. 20.

The cell buffer 16-7 temporarily retains the exclusive cell caught by this exclusive flag checking section 16-6, and makes a plurality of copies of this exclusive cell to be sent to all the interface units 15. The total tag generator 16-8 generates tag information to all the interface units 15 according to an algorithm as exemplified in FIG. 21, affixes this tag information to each exclusive cell from the cell buffer 16-7 and sends the resultant cell to the ATM switch 12.

In other words, the cell buffer 16-7 and the total tag generator 16-8 in this mode constitute a cell converting/copying section, which affixes total tag information to an exclusive cell and makes a plurality of copies of the cell having the same contents.

With this structure, the ATM exchange system 11 performs the following processes in addition to the processes in the ATM exchange system 11 which has been discussed with reference to FIG. 13.

First, the exclusive flag checking section 16-6 in the concentrator 16 catches a local exclusive cell from the interface unit 15 in which an exclusive cell flag is set. Then, the cell buffer 16-7 and the total tag generator 16-8 affix total tag information to the local exclusive cell, makes copies of the cell having the same contents and sent those local exclusive cells to the ATM switch 12.

Any interface unit 15 which has received this local exclusive cell automatically identifies and specifies the interface unit 15 which has transmitted the logical exclusive cell. Based on the identification, the PVC for the local use only is connected (set) between the interface units 15 very easily.

Figure 22:
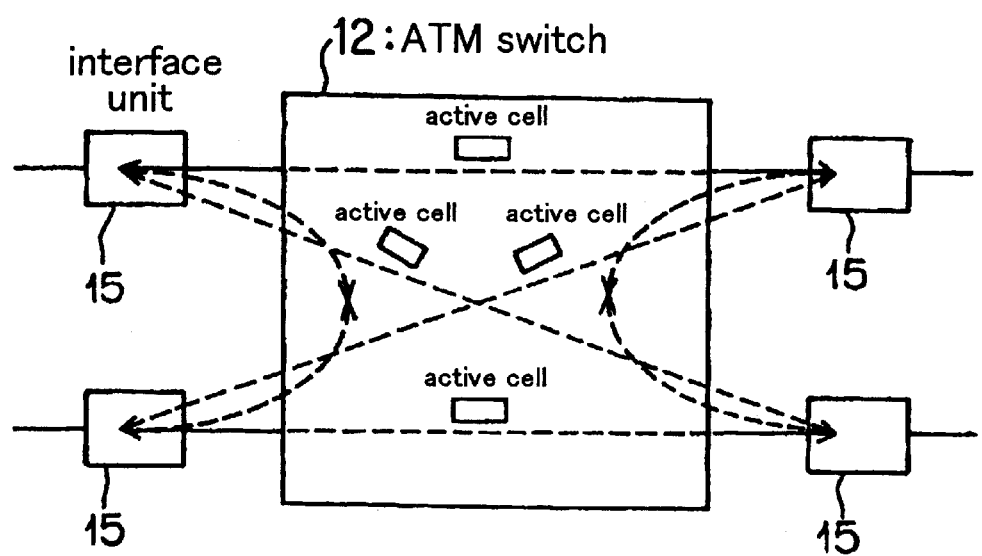
FIG. 22 is a diagram for explaining the operation of the mode in FIG. 19.

Thereafter, the regular cell transmitter 15-10 in each interface unit 15 in this ATM exchange system 11 sends an active cell via the PVC to the other interface units 15 at a given period in the image as illustrated in, for example, FIG. 22. At the same time, the regular cell extractor 15-11 monitors active cells from the other interface units 15 than the local one.

The interface unit 15 which has received the regular cell from any other interface unit 15 sequentially stores information indicating the arrival of the active cells into a storage table like a memory and checks this table after a given time. When there is any interface unit 15 from which the active cell has not arrived yet, the local interface unit 15 determines that some failure has occurred in that interface unit 15. The microprocessor 15-8 extracts the connection (VPC/VCC) which passes the failed interface unit 15, and informs the AIS cell controller 15-4 and the cell counter controller 15-7 of the connection.

The informed AIS cell controller 15-4 sends an AIS cell to the path which matches with the informed VPC/VCC, while the informed cell counter controller 15-7 disable the counting of the cell counter 15-6.

In other words, in the ATM exchange system 11 in this mode, each interface unit 15 sends an active cell to the other interface units at a given period via the PVCs established between the individual interface units 15, monitors active cells from those interface units 15 other than itself, and sends an AIS cell to all the connected paths when any active cell is not received at a given interval.

When the arrival of the active cell at the given interval is detected again after the transmission of the alarm cell, the interface unit 15 inhibits the transmission of the AIS cell from the regular cell transmitter 15-10. At the same time, the cell counter controller 15-7 restarts the counting of the cell counter 15-6.

In short, each interface unit 15 in the ATM exchange system 11 in this mode sends an AIS cell to the other interface units 15 at a given period and monitors active cells from the other interface units 15 than itself. When any active cell doe not arrive at a given interval, the interface unit 15 sends an AIS cell to every connected path until the active cell arrives again at a given interval. It is therefore possible to specify any failed interface unit 15 very easily and promptly cope with the failure.

In this case, when the AIS cell is sent out, the interface unit 15 disables the counting of the cell counter 15-6 until the active cell arrives at a given interval and the transmission of the AIS cell is stopped. This can surely prevent an unnecessary charge and always make an accurate charge.

The interface unit 15 shown in FIG. 19, like the one in the first mode, may be so designed as to comprise only the AIS cell controller 15-4, the cell counter 15-6 and the cell counter controller 15-7, so that when any active cell does not arrive at a given period, the AIS cell is sent to the line side and the counting of the cell counter 15-6 is disabled.

(d) Fourth Mode

Figure 23:
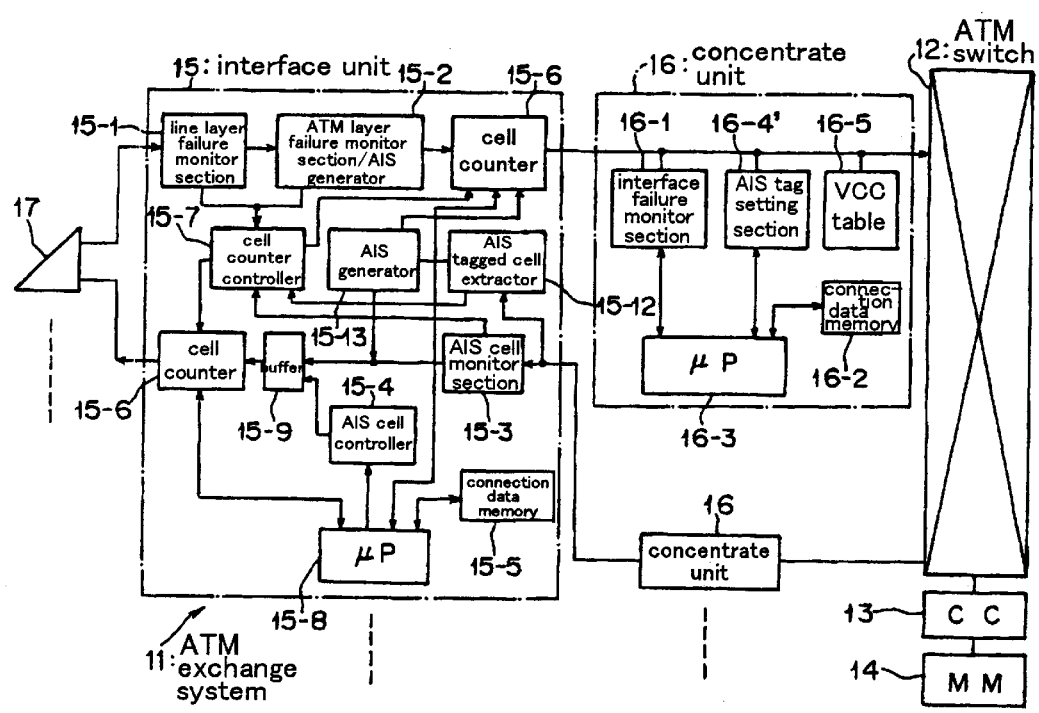
FIG. 23 is a block diagram illustrating an interface unit and a concentrator according to the fourth mode in the ATM exchange system shown in FIG. 12.

FIG. 23 is a block diagram showing the structure of an ATM exchange system according to the fourth mode of this invention. In this diagram, same reference numerals as given in FIG. 14 also indicate the corresponding components in FIG. 14. In the ATM exchange system 11 in this mode, the interface unit 15 comprises an AIS tagged cell extractor 15-12 and an AIS generator 15-13 in addition to the components shown in FIG. 14, and the concentrator 6 has an AIS tag setting section 16-4' in place of the AIS cell image generator 16-4 shown in FIG. 14.

In the concentrator 16, the interface failure monitor section 16-1 detects a failure in the interface unit 15, and upon detection of such a failure, the AIS tag setting section (alarm cell information transmitter) 16-4' affixes a bit (information) indicative of an AIS cell into the tag area in the input cell and sends this cell to the ATM switch 12.

In the interface unit 15, the AIS tagged cell extractor (alarm cell information receiver) 15-12 receives the cell affixed with the AIS-cell indicating bit, and when such reception is done, the AIS cell generator (pseudo alarm cell generator) 15-13 produces a pseudo AIS cell (pseudo alarm cell) and sends it to the line side.

The cell counter controller 15-7 in this mode is designed to disable the counting of the cell counter 15-6 even when receiving a cell affixed with the AIS-cell indicating bit as well as to perform the operations discussed earlier with reference to FIG. 14.

According to the ATM exchange system 11 with this structure, besides the, individual processes that have been explained earlier with reference to FIG. 14, when the interface failure monitor section 16-1 in the concentrator 16 detects the occurrence of a failure in the interface unit 15, the AIS tag setting section 16-4' affixes an AIS-cell indicating bit into the tag area in the input cell and sends this cell to the ATM switch 12 via the VCC table 16-5.

When the cell affixed with the AIS-cell indicating bit is received and extracted by the AIS tagged cell extractor 15-12 in any other interface unit 15, the AIS cell generator 15-13 in this interface unit 15 produces a pseudo AIS cell and sends it to the line side, and the cell counter controller 15-7 disables the counting of the cell counter 15-6.

In other words, when the concentrator 16 detects a failure in the interface unit 15 in the ATM exchange system 11 in this mode, the concentrator 16 sends a cell affixed with the AIS-cell indicating bit to the ATM switch 12.

Any other interface unit 15 which has received this cell produces a pseudo AIS cell and sends it to the line side, so that the occurrence of a failure in the interface unit can be reported to the line side while minimizing the scales and loads of the concentrator 16 and the interface unit 15. It is therefore possible to surely recognize the occurrence of such a failure and properly cope with it.

Since the interface unit 15 which has received the cell affixed with the AIS-cell indicating bit disables the counting of the cell counter 15-6 in this case, it is also possible to surely prevent an unnecessary charge and always make an accurate charge.

According to the failure attending method for a fixed-length cell exchange system and the interface unit equipped in a fixed-length cell exchange system both embodying this invention, when the interface section receives an alarm cell, transmitted upon occurrence of a failure in the cell multiplex/exchange layer, the interface section disables the counting of the charge counter for the associated connection until the failure is cleared and the transmission of the alarm cell is stopped. It is therefore possible to surely prevent an unnecessary charge when a failure occurs and always make an accurate charge.

According to the failure attending method for a fixed-length cell exchange system and the interface unit equipped in a fixed-length cell exchange system both embodying this invention, when the interface section receives a remote reception failure cell, transmitted from the end terminal (subscriber's terminal) of the cell multiplex/exchange layer upon the occurrence of a failure in the cell multiplex/exchange layer, this interface section disables the counting of the charge counter for the associated connection until the failure is cleared and the transmission of the remote reception failure cell is stopped. In this case too, it is also possible to surely prevent an unnecessary charge when a failure occurs and always make an accurate charge.

According to the failure attending method for a fixed-length cell exchange system and the interface unit equipped in a fixed-length cell exchange system both embodying this invention, when a failure occurs in one of a plurality of interface sections, any interface unit other than the failed interface section sends an alarm cell to the path which is connected to the failed interface section based on the specific ID information or routing information about the failed interface section until the failure is cleared. Even when a failure occurs in some interface section which should send an alarm cell, this failure can surely be recognized and can be properly attended.

Even when any interface section sends an alarm cell in the above-described manner, this interface section disables the counting of the charge counter until the failed interface section is restored and the transmission of the alarm cell is stopped. It is therefore possible to surely prevent an unnecessary charge when a failure occurs and always make an accurate charge.

According to the failure attending method for a fixed-length cell exchange system and the concentrator equipped in a fixed-length cell exchange system both embodying this invention, when the concentration section detects a failure occurring in one interface section, the concentration section sends an alarm cell to every connection until the failed interface section is restored. Even when a failure occurs in some interface section which should send an alarm cell, the concentration section can send an alarm cell to inform every connection of the occurrence of the failure. Accordingly, a failure in the interface section can always be attended properly.

When the concentration section sends an alarm cell, the counting of the charge counter in the failed interface section is disabled until the failure is cleared and the transmission of the alarm cell from the concentration section is stopped. It is therefore possible to surely prevent an unnecessary charge when a failure occurs and always make an accurate charge in this case too.

According to the failure attending method for a fixed-length cell exchange system and the interface unit equipped in a fixed-length cell exchange system both embodying this invention, each interface section sends an active cell to the other interface sections in a predetermined period, monitors active cells from the other interface sections, and sends an alarm cell to all the connected paths when any active cell does not arrive at a given interval until the active cell arrives again at the given interval. It is possible to very easily specify any failed interface section and promptly cope with the failure.

In this case, when an alarm cell is transmitted in the aforementioned manner, the counting of the charge counter in the interface section is disabled until the active cell arrives again at a given interval and the transmission of the alarm cell is stopped. It is thus possible to surely prevent an unnecessary charge when a failure occurs and always make an accurate charge.

According to the concentrator equipped in a fixed-length cell exchange system embodying this invention, a local exclusive cell from any interface section, which carries the specific ID number or routing information about the interface section, is caught, total routing information is affixed to this local exclusive cell, and a plurality of copies of this local exclusive cell having the same contents are made and sent out. Any interface section which has received this local exclusive cell identifies and specifies the interface section which has sent that local exclusive cell from the contents of the local exclusive cell, thus ensuring easy execution of the desired processes, such as the establishment of a permanent connection to that interface section.

According to the failure attending method for a fixed-length cell exchange system embodying this invention, when a failure occurs in the intermediate switch stage in the exchange switch section having three or more switch stages, the fixed-length cell exchange system (main controller) sends the routing information about the failed switch stage to all the implemented interface sections. Upon reception of this routing information, each interface section sends an alarm cell to the path which matches with the received routing information. Even when the exchange switch section fails, therefore, each interface section can send out an alarm cell to ensure the recognition of the failure, which can therefore be properly attended.

In this case too, the interface section sends an alarm cell and disables the counting of the charge counter until the failed intermediate switch stage is restored. This can surely prevent an unnecessary charge and always make an accurate charge.

With the use of the failure attending method for a fixed-length cell exchange system and the fixed-length cell exchange system according to this invention, when the concentration section detects a failure in the interface section, the concentration section sends a cell affixed with alarm-cell indicating information to the exchange switch section.

Any other interface section which has received this cell produces a pseudo alarm cell and sends it to the line side. This permits the occurrence of a failure in the interface unit to be reported to the line side while minimizing the scales and loads of the concentrator 16 and the interface unit 15. It is therefore possible to surely recognize the occurrence of such a failure and properly cope with it.

Since the interface section which has received the cell affixed with the alarm-cell indicating information disables the counting of the charge counter in this case, it is also possible to surely prevent an unnecessary charge and always make an accurate charge.

With the use of the failure attending method for a fixed-length cell exchange system and the interface unit equipped in a fixedlength cell exchange system according to this invention, when any interface section detects a line layer failure, this interface section disables the counting of the charge counter for every connection until the failed line layer is restored. It is also possible to prevent an unnecessary charge when a failure occurs and always make an accurate charge in this case.

A description will now be given of an embodiment of this invention which copes with the matching between software and hardware in the above-described ATM exchange system.

Figure 24:
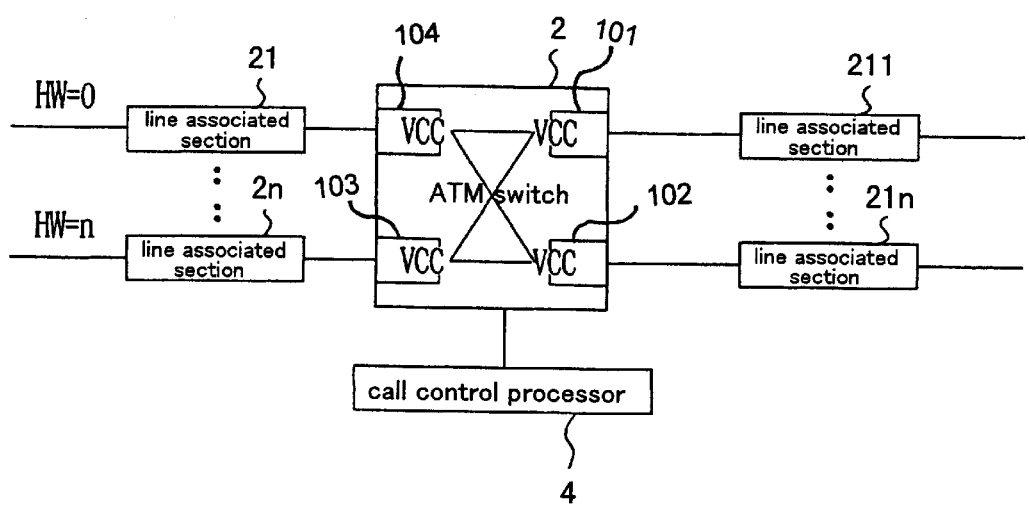
FIG. 24 is a block diagram for explaining a software-hardware matching method for use in the ATM exchange system embodying this invention.

FIG. 24 is a block diagram that shows the structure of an ATM exchange system to which this invention is directed and that is used for explaining the position of this invention in dealing with the software-hardware matching. As discussed earlier, the ATM switch 2 controls an SVC call/PVC call to connect or disconnect paths.

The ATM exchange system has line associated sections 21 to 2n and 211 to 21n, which are provided in association with a plurality of lines, the ATM switch section 2, and a call control processor 4 which controls an SVC call/PVC call to connect or disconnect paths in the ATM switch section 2. The line associated sections 21–2n and 211–21n in FIG. 24 are the collective representation of the interface units and concentrators in the above-described modes.

In FIG. 24, virtual channel circuits (VCCs) 101 to 104 which are located in the ATM switch section 2 and are to be connected to the line associated sections serve to identify virtual path identifiers for setting paths in the ATM switch section 2. Those VCCs may be located in the line associated sections 20–2n and 210–21n.

Figure 25:
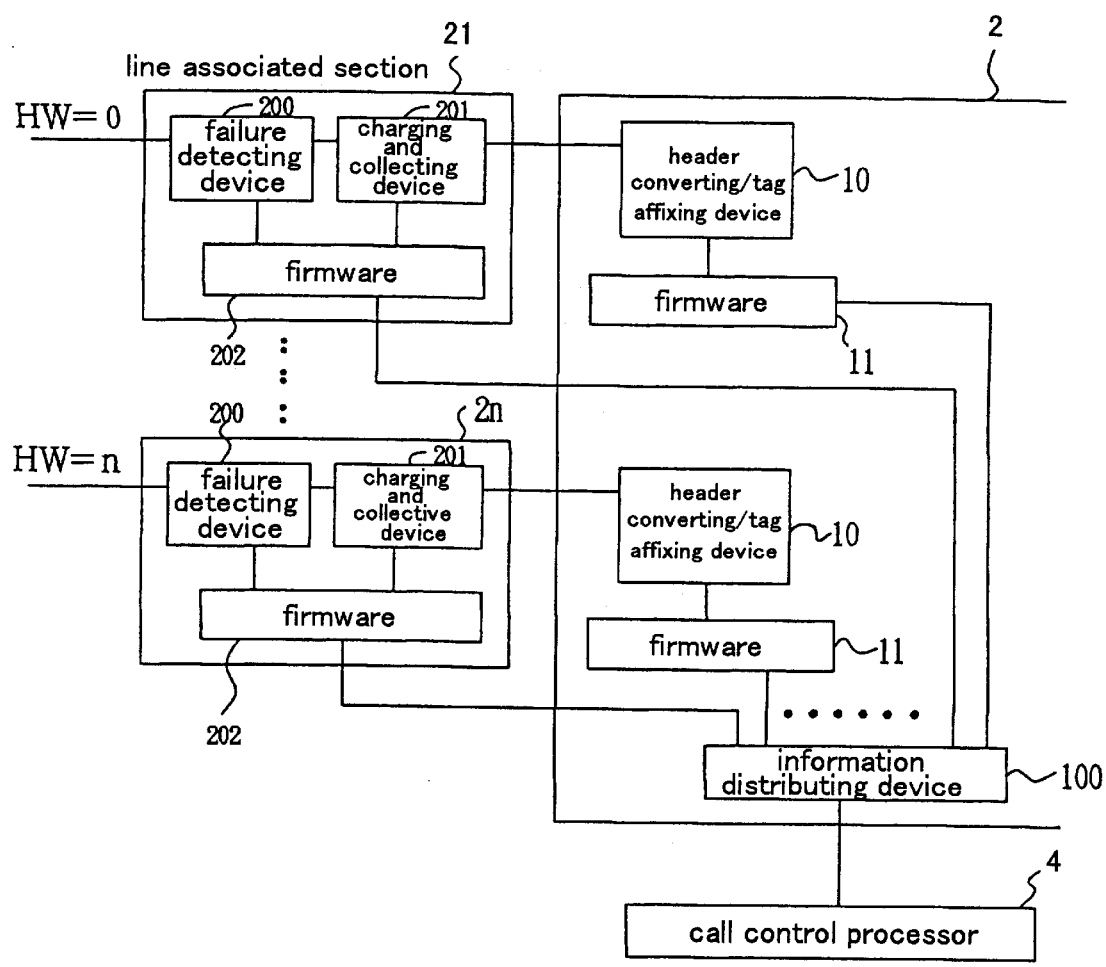
FIG. 25 is a block diagram illustrating one embodiment of the software-hardware matching method for use in the ATM exchange system embodying this invention.

FIG. 25 is a block diagram giving the detailed illustration of those portions in the ATM exchange system which directly relate to this invention. In FIG. 25, the line associated sections 21–2n have the same structure and each include a failure detecting device 200, a charging and concentrating device 201 and firmware 202 as a hardware device.

The failure detecting device 200 and the charging and concentrating device 201, excluding the firmware 202, may be constructed as specific hardware devices, or their failure detecting function and charging/concentrating function may be accomplished by software.

The ATM switch 2 has a header converting/tag affixing device 10 and firmware 11, connected to each line associated section, and a common information distributing device 100 in relation to this invention. The header converting/tag affixing device 10 has a function of converting the VPI/VCI in the header portion in an ATM cell to path setting information and a function of affixing a tag to the ATM cell to be sent to each line.

The header converting/tag affixing device 10 and the information distributing device 100, like the line associated sections 20–2n, may have their functions accomplished by software. In the following description, the connection information is called "software side" and the switch section 2 is called "hardware side" as needed.

Figure 28:
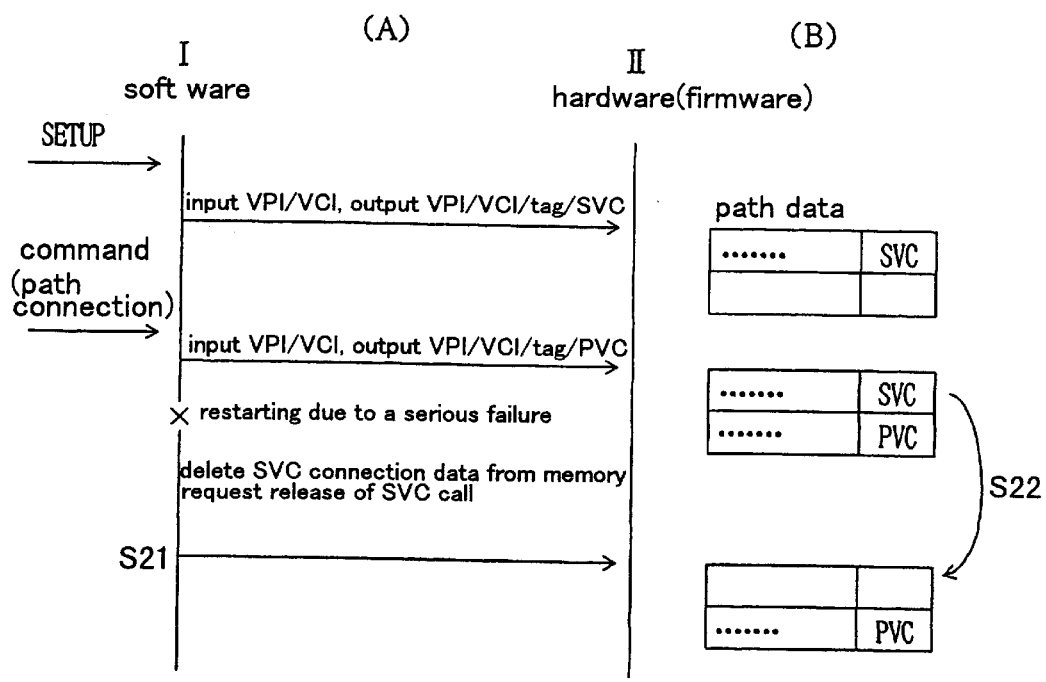
FIG. 28 is a diagram illustrating a process sequence (part 1) between software and hardware in the software-hardware matching method in the ATM exchange system of this invention.

FIGS. 26 and 28 are diagrams for explaining the structure for matching path information between the software side and hardware side when the call control processor 4 in the ATM exchange system restarts the processing.

When the call control processor 4 restarts the operation after recovering from a serious failure, it is necessary to release all SVC calls and save a PVC call. The illustrated structure is for matching the software side with the hardware side at that time.

Connection information in the memory of the software side is given something to identify an SVC call and a PVC call. FIG. 26 exemplifies such connection information in the memory of the software side. An SVC and PVC identification flag (see the rightmost column in FIG. 26) is included as a connection type parameter in the parameters (including input and output VPI/VCI, call and reception dial numbers, etc.) that are needed to request the ATM switch section 2, hardware, for path connection.

The ATM switch section 2, hardware, has an ability of identify an SVC call and a PVC call from the SVC and PVC ID flag. The information distributing device 100 in this ATM switch section 2 has such a function.

Figure 27:
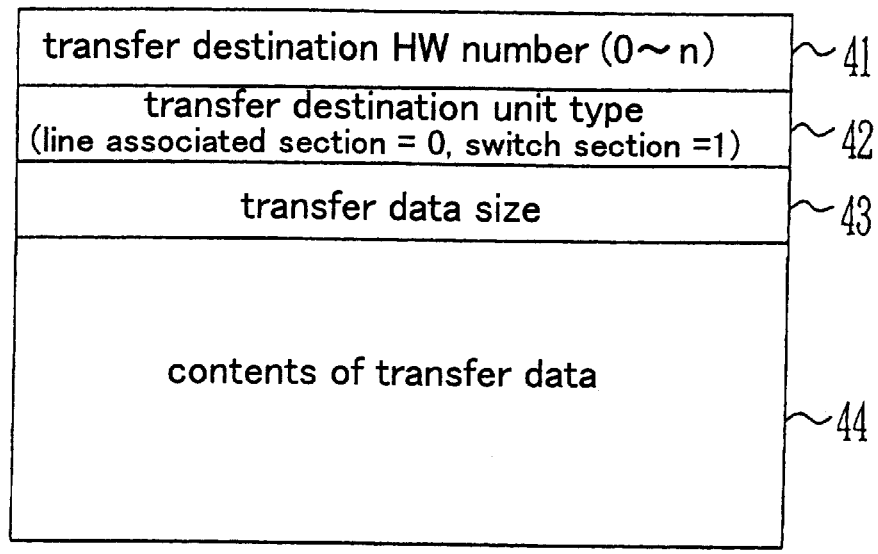
FIG. 27 is a diagram showing the information format between a call control processor and an ATM switch in the software-hardware matching method in the ATM exchange system of this invention.

FIG. 27 exemplifies the information format for transmission between the call control processor 4 and the ATM switch section 2. The information format includes the transfer path number of the transfer destination 41 (HW0 to HWn), transfer destination unit type 42 (line associated section=0, ATM switch section=1), transfer data size 43 and transfer data 44.

FIG. 28 illustrates a process sequence between the software side I (call control processor 4) and the hardware side II (ATM switch section 2).

In the normal state, connection information shown in FIG. 26 is sent to the hardware side II from the software side I using the information format in FIG. 26. Assume that at a time X, the call control processor 4 has recovered from a serious failure. A request to delete SVC connection data from the memory and an SVC call release request are sent to the hardware side II from the software side I (step S21). As a result, the SVC identifier which has already been set as path data, as shown in column B in FIG. 28, is deleted from the hardware side memory, e.g., memory 11 for storing firmware (step S22).

In the case where a serious failure occurs in the call control processor 4, when the call control processor 4 restarts, connection data having the SVC call identifier affixed to connection information on software is released on the software side memory alone during the restarting process. During restarting, an SVC call release request is sent to the hardware side.

When serious failure occurs, therefore, information about an SVC call is released from the software side and the hardware side (specifically firmware 11) to reduce the amount of communications between the software side and the hardware side. This can ensure a fast restarting process.

Figure 29:
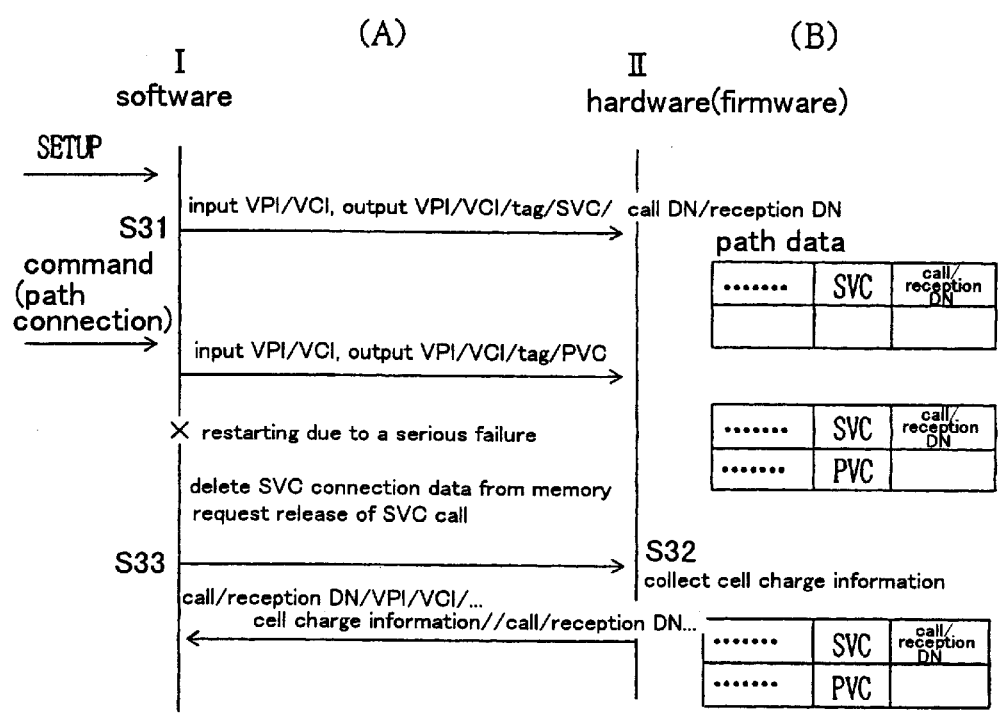
FIG. 29 is a diagram illustrating a process sequence (part 2) between software and hardware in the software-hardware matching method in the ATM exchange system of this invention.

FIG. 29 shows a process sequence for saving charge data of an SVC call as well as performing the processes in FIG. 28. Specifically, not only the input VPI/VCI and output VPI/VCI but also the call DN (call dial number) and reception DN (reception dial number) are sent to the hardware side (firmware 11) at the time a path is connected (step S31).

When an SVC call is released by the hardware itself, the hardware side collects cell count information for the released path (step S32). Then, the cell count information is affixed to the input VPI/VCI, the output VPI/VCI and the call DN/reception DN, which are sent to the call control processor 4 to collects charge data of the SVC call (step S33).

As shown in FIG. 29, after the call control processor 4 (software side I) restarts the operation, the call control processor 4 sends an SVC call release request to the ATM switch 2. In response to this request, the VPI, VCI and the call dial number DN, which are needed for making a charge, and charge counter information retained in the ATM switch 2 can be sent to the call control processor 4.

In this manner, charge information can be saved and the amount of communications between the software and the hardware (firmware) can be reduced, thus allowing the restarting process to be finished quickly.

Figure 31:
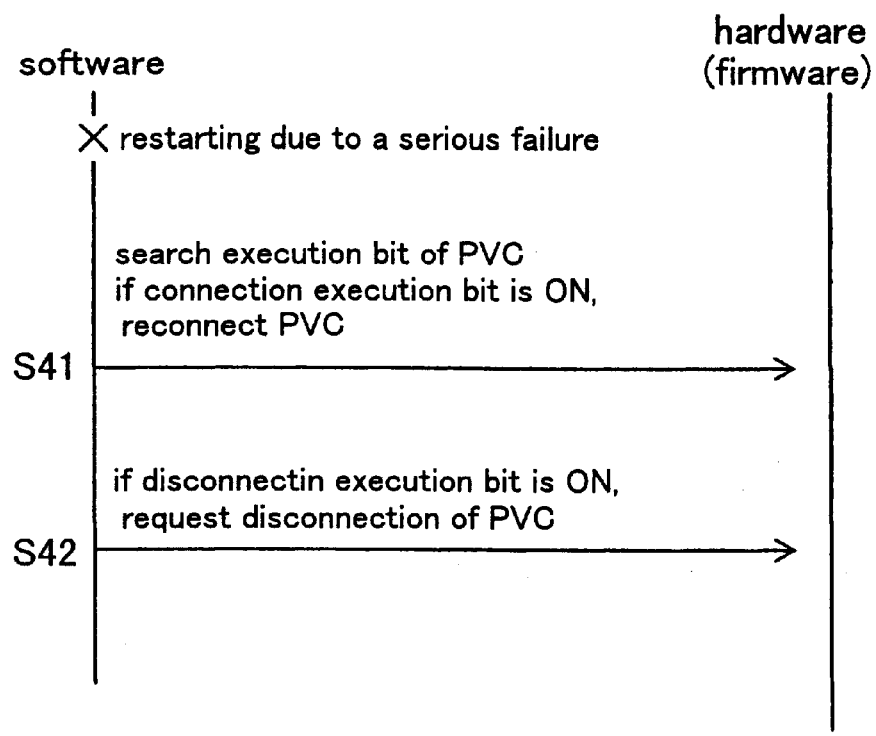
FIG. 31 is a diagram illustrating a process sequence (part 3) between software and hardware in the software-hardware matching method in the ATM exchange system of this invention.

FIGS. 30 and 31 are diagrams for explaining a system for saving a PVC path. As should be understood from the foregoing description of this mode, a PVC call remains saved on the unillustrated memory in the call control processor 4 (software side) and the firmware memory 11 in the ATM switch section 2 (hardware side).

With regard to a PVC path, it is necessary to consider the case where the call control processor 4 may restart in response to some command during path connection or path disconnection. When a command is issued, an execution bit (indicating connection or disconnection in progress) is set in the connection information on the software side (the rightmost column in FIG. 30). When the command is executed, this ID bit is set off (inverted or erased).

For the connection with the connection execution bit (connection ON) during restarting, a request to connect the PVC again is sent to the ATM switch 2 (hardware side) as illustrated in the process sequence in FIG. 31 (step S41). This will save the PVC path. If the disconnection execution bit is ON, a request to disconnect the PVC is sent (step S42) to accomplish the disconnection.

For the PVC path under execution of a command, therefore, restarting can be completed quickly by simply performing a matching process associated with the path under execution between the software side and the hardware side.

Figure 32:
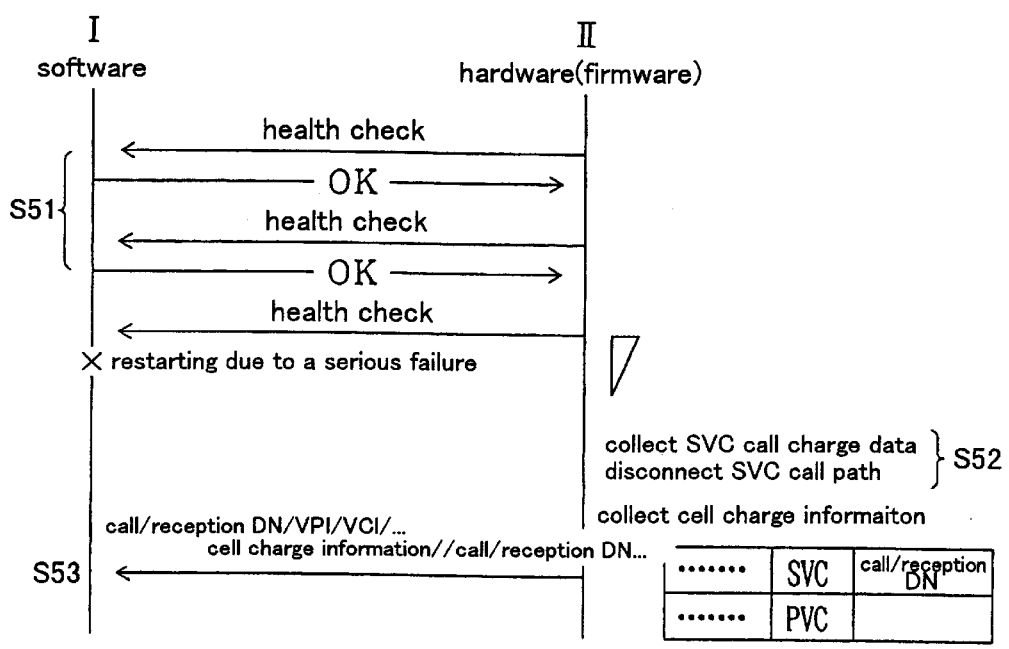
FIG. 32 is a diagram illustrating a process sequence (part 4) between software and hardware in the software-hardware matching method in the ATM exchange system of this invention.

FIG. 32 shows a process sequence for explaining the structure which prevents over charging of an SVC call during restarting. The firmware 11 of the ATM switch 2 or the hardware side II regularly performs a health check on the call control processor 2 or the software side I.

The health check is performed for a given period of time (step S51). When the check results no good (NG), the firmware 11 disconnects the path associated with the SVC call by itself and concentrates charge data. The charge data is concentrated by the method that has already been discussed referring to FIG. 29. Then, the path for the SVC call is released (step S52).

Accordingly, it is possible to send charge data to the call control processor 4 after restoration (step S53) and to prevent over charging of the SVC call.

Figure 34:
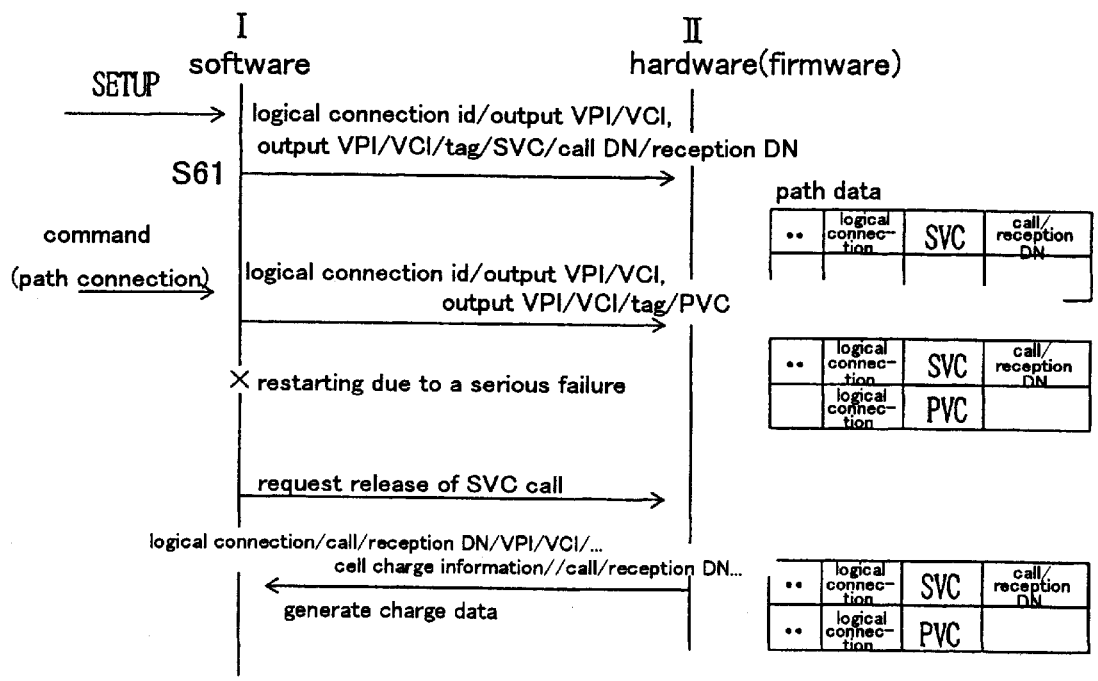
FIG. 34 is a diagram for explaining the introduction (part 1) of a logic connection between software and hardware in the software-hardware matching method in the ATM exchange system of this invention.

FIGS. 33 and 34 are diagrams for explaining the structure which executes a regular matching process. As illustrated, the introduction of a logical connection id can eliminate the need for the search process by the call control processor 4, thus accelerating the information transmission from the firmware 11.

The logical number id of the connection detected by the call control processor 2 or the software side I is also sent to the firmware 11 in the ATM switch 2 or the hardware side II (step S61; FIG. 34).

This logical number id can be associated with an address in the memory, so that with the logical number id used as a key, matching of the connection id between the software side I and the hardware side II can be made.

Various ways are available to set the logical number id. For example, a logical connection id specific to the system may be set or a specific logical connection id may be set for each line.

Figure 35:
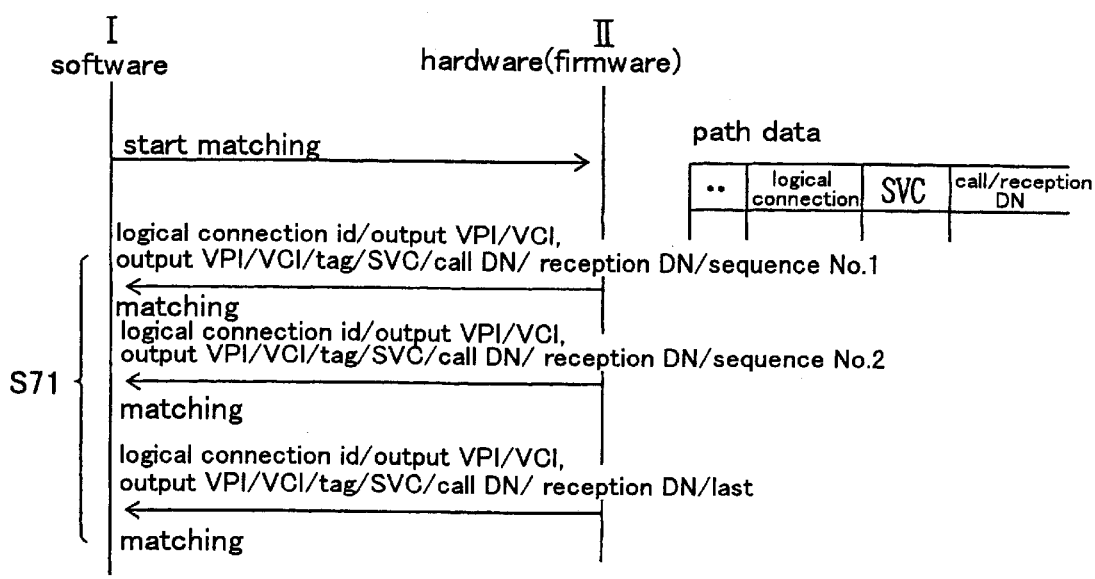
FIG. 35 is a diagram for explaining the introduction (part 2) of a logic connection between software and hardware in the software-hardware matching method in the ATM exchange system of this invention.

FIG. 35 shows a process sequence for explaining matching of detailed information based on regular information read out. Based on a regularly issued instruction from the software side I, detailed data retained in the firmware 11

(input VPI/VCI, output VPI/VCI, tag information and UPC/ NPC information) is affixed to the logical connection id, which has been discussed above referring to FIG. 34, and the resultant data is sent to the software side I (step S71).

The software side I compares connection information, which matches with the logical connection id used as a key, with the connection information sent from the firmware 11.

The connection matching process which is carried out using the logical connection id and the sequence number as keys can reduce the number of communication lines between the software side I and the firmware 11 on the hardware side II and can allow a matching process on the software without requiring a search process. It is therefore possible to increase the processing speed of the processor and suppress the load on the processor.

Figure 36:
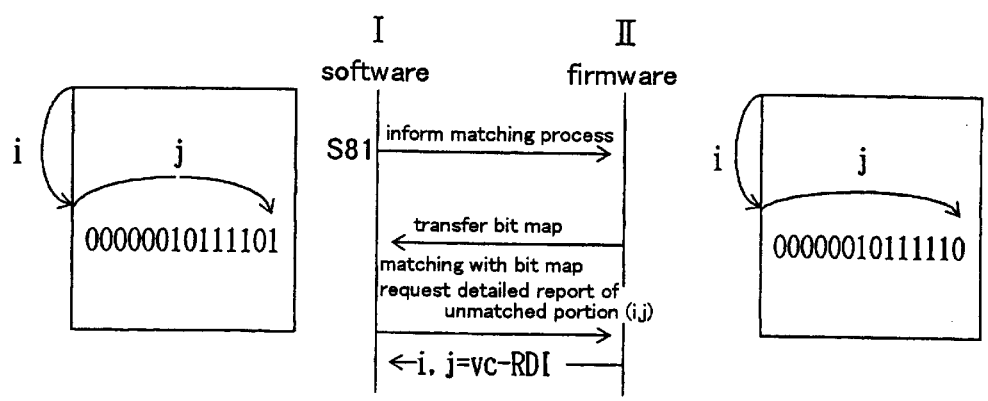
FIG. 36 is a diagram for explaining matching of VP and VC statuses using the logic connection id in the software-hardware matching method in the ATM exchange system of this invention.

FIG. 36 is a diagram for explaining a matching process with respect to a change in VP/VC status during restarting of the call control processor 4, or full status matching based on VP/VC management information.

After the call control processor 4 recovers and restarts the operation, the software side I informs the individual line associated units on the hardware side II of the matching process (step S81). The firmware 11 belonging to each informed line associated unit informs the software side I of the presence or absence of a failure using the logical connection id as a key.

The software side I compares the logical connection id used as a key with failure presence/absence information for the associated connection, which is retained on the software side.

When there is no match, the software side I request the firmware 11 to send detailed failure information of VP/VC. The software status is changed based on received information for matching with the failure information of VP/VC.

More specifically, referring to FIG. 36, the software side I receives the bit map of the VP/VC status recorded at the address associated with the logical connection id (I, J) from the firmware 11. This can reduce the amount of information and can facilitate matching on software. It is also possible to reduce the load on the communications between the software and hardware and on the call control processor 4.

Figure 37:
FIG. 37 is a diagram for explaining the contents of a frame memory (part 1) in the software-hardware matching method in the ATM exchange system of this invention.
Figure 38:
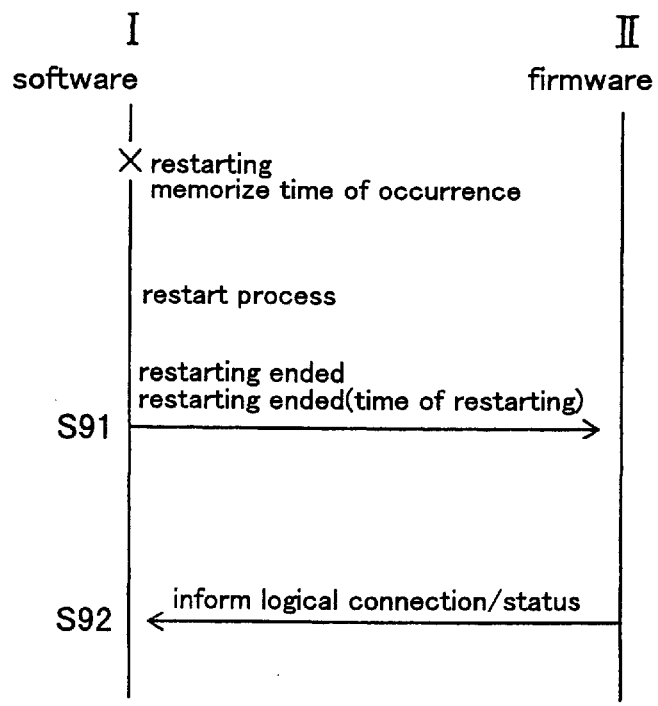
FIG. 38 is a diagram for explaining an example in which the history of VP and VC statuses is grasped by firmware in the software-hardware matching method in the ATM exchange system of this invention.

FIGS. 37 and 38 are diagrams of the structure which permits the history management on the firmware 11 and allows the firmware 11 itself to report an event which has occurred during restarting of the call control processor 4.

The time at which the call control processor 4 restarted the process and the restart end time are detected, and the firmware 11 is informed of the event occurred time (see FIG. 37) (step S91). The firmware 11 manages the history of old changes in the VP/VC status and sequentially searches the changes in the VP/VC status that has occurred up to the present since the restart time included in the information from the call control processor 4 indicating the end of restarting, in the older-to-younger order.

In other words, the changes in the VP/VC status are sequentially written on the firmware memory 11 of a fixed size in the order of the event occurred times as shown in FIG. 37, and this writing returns to the top address when writing at the last address is done.

By sequentially reading the contents written in the memory, data on a change (transition) in the VP/VC status can be grasped. This data is sent together with the logical connection id to the software side I (step S92) for matching between the hardware side and the software side.

Figures 39, 40:
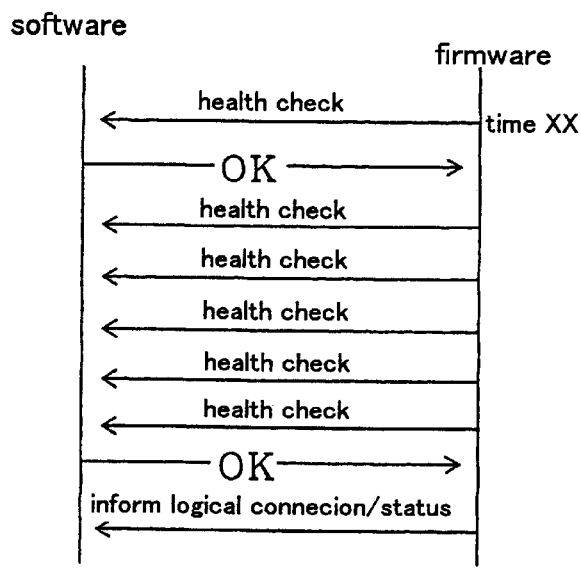
FIG. 39 is a diagram for explaining status matching using a health check function in the software-hardware matching method in the ATM exchange system of this invention.
FIG. 40 is a diagram for explaining the contents of a frame memory (part 2) in the software-hardware matching method in the ATM exchange system of this invention.

FIG. 39 is a diagram for explaining status matching using a health check function. The firmware 11 performs a health check on the call control processor 4. Given that the period for the health check is N seconds (e.g., 1 sec), the firmware 11 can always hold the history of the VP/VC status over the last N seconds.

When the health check results in NG, the status history over the last N seconds and a change in the VP/VC status until the health check provides the satisfactory result are retained, and the VP/VC status history retained by the call control processor 4 is sent out in the same way as has been explained above with reference to FIGS. 37 and 38, at the time the health check provides the satisfactory result (OK).

Accordingly, the matching between the software side I and the hardware side II is performed. The VP/VC status matching can be performed quickly with a reduced amount of information as per the case in FIGS. 37 and 38.

FIG. 40 is a diagram for explaining an example which retains the latest status only. In VPIVC status changes occurred from N seconds before the point of the unsatisfactory health check result to requisition of the satisfactory health check result in FIG. 39, when the same VP/VC change occurs, the old statuses of this VPIVC are discarded and the new status alone is retained. This can suppress the memory capacity of the firmware 11 to the size equivalent to the maximum number of connections available to the associated line.

Figure 41:
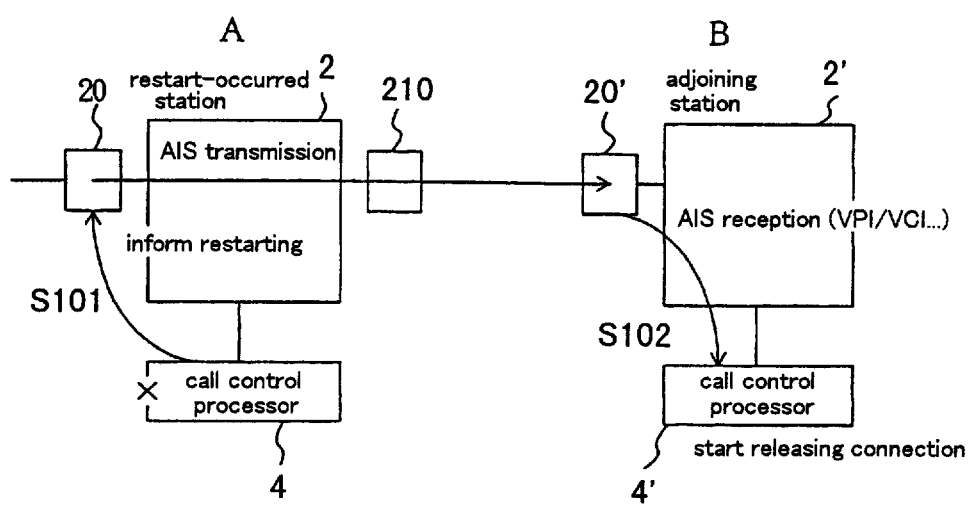
FIG. 41 is a diagram for explaining how to inform adjoining stations of a call release process in the software-hardware matching method in the ATM exchange system of this invention.

FIG. 41 is a diagram for explaining how to inform an adjoining station B of an SVC call release process by sending an AIS signal when a serious failure occurs. In this diagram, reference numeral "2" is the ATM switch section of a restart-occurred state A which restarts the call control processor 4, reference numeral "2'" is the ATM switch section of the adjoining station B, and reference numeral "4'" is the call control processor in the adjoining station B. The reference numbers 20, 20' and 210 refer to identical type of line interface parts.

When the hardware side detects that the call control processor 4 restarts from a serial failure, a connection AIS (VC-AIS) cell for the SVC connection is sent to the adjoining station B based on the SVC/PVC path identifier which has already been informed. As a result, the adjoining station B is informed of releasing of the SVC connection.

In the case where a path release for the connection which has received the AIS cell is performed, the SVC/PVC path identifier and the logical connection id managed by the software side should have been sent to the hardware side (firmware) previously at the time the path was connected (step S101).

The upstream station A sends an AIS or the downstream station sends an RDI signal to the logical connection. When the connection is for an SVC call, the hardware side (firmware), which has detected this RDI signal, sends the software side of the call control processor 4' a request to release the logical connection id, informed at the time the path was connected, through the associated line associated section (step S102).

As illustrated, the restarting-occurred exchange station A instructs each line unit to send an AIS cell downstream (step S101). Upon reception of this AIS cell, the downstream adjoining station B knows that the connection has failed. If this connection is the SVC connection, a release process can be performed.

Further, a release request can be made to the adjoining station B before the restarting-occurred exchange station A recovers and restarts, thus avoiding over charging.

What is claimed is:

1. A failure attending method for a fixed-length cell exchange system for handling fixed-length cells, including an exchange switch section, a main controller for said exchange switch section and a plurality of interface sections connected to input and output sections of said exchange switch section, comprising the steps of:
    a time of connecting a path to each interface section, affixing specific identification information about a facing unit to path information which indices a connection path to the facing unit so as to set said path:
        when a failure occurs in one of said plurality of interface sections, allowing said main controller to send specific identification information about said failed interface section to other interface sections than said failed interface section; and
        causing each interface section having received said specific identification information about said failed interface section to send an alarm cell to a path which matches with said received specific identification information,
    wherein when said failed interface section is restored, and main controller informs other interface sections than said failed interface section of restoration; and
    each of said informed interface sections stops sending said alarm cell.

2. The method according to claim 1,
    wherein each interface section having received said specific identification information about said failed interface section sends said alarm cells to a path which matches with said received specific identification information, and disables counting of a charge counter.

3. The method according to claim 2, wherein when said failed interface section is restored, said main controller informs other interface sections than said failed interface section of restoration; and
    each of said informed interface sections stops sending said alarm cell, and restarts counting of said charge counter.

4. An interface section connected to an input/output section of an exchange switch section in a fixed-length cell exchange system for handling fixed-length cells, comprising:
    a charge counter;
    an identification information storage section for storing specific identification information about a facing unit;
    an identification information receiver for receiving specific identification information about a failed interface section from a main controller for said exchange switch section;
    a path detector for, when said identification information receiver receives said specific identification information about said failed interface section, searching said identification information storage section to detect a path which matches with said received specific identification information;
    an alarm cell transmitter for transmitting an alarm cell to said path detected by said path detector; and
    a charge counter controller for disabling counting of said charge counter for said path detected by said path detector,
    wherein when informed of restoration of said failed interface section by said main controller, said alarm cell transmitter stops sending said alarm cell; and when transmission of said alarm cell from said alarm cell transmitter is stopped, said charge counter controller restarts counting of said charge counter.

5. A failure attending method for a fixed-length cell exchange system for handling fixed-length cells, including an exchange switch section, a main controller for said exchange switch section and a plurality of interface sections connected to input and output sections of said exchange switch section, comprising the steps of:
    when a failure occurs in one of said plurality of interface sections, allowing said main controller to send routing information about said failed interface section to other interface sections than said failed interface section; and
    causing each interface section having received said routing information about said failed interface section to send an alarm cell to a path which matches with said received routing information,
    wherein when said failed interface section is restored, said main controller informs other interface sections than said failed interface section of the restoration; and
    each of said informed interface sections stop sending said alarm cell.

6. The method according to claim 5,
    wherein each interface section having received said routing information about said failed interface section sends said alarm cell to a path which matches with said received routing information, and disables counting of a charge counter.

7. The method according to claim 6, wherein when said failed interface section is restored, said main controller informs other interface sections than said failed interface section of restoration; and
    each of said informed interface sections stops sending said alarm cell, and restarts counting of said charge counter.

8. An interface section connected to an input/output section of an exchange switch section in a fixed-length cell exchange system for handling fixed-length cells, comprising:
    a charge counter;
    a routing information storage section for storing routing information;
    a routing information receiver for receiving routing information about a failed interface section from a main controller for said exchange switch section;
    a path detector for, when said routing information receiver receives said routing information about said failed interface section, searching said routing information storage section to detect a path which matches with said received routing information,
    an alarm cell transmitter for transmitting an alarm cell to said path detected by said path detector; and
    a charge counter controller for disabling counting of said charge counter for said path detected by said path detector,
    wherein when informed of restoration of said failed interface section by said main controller, said alarm cell transmitter stops sending said alarm cell; and
    when transmission of said alarm cell from said alarm cell transmitter is stopped, said charge counter controller restarts counting of said charge counter.

9. A failure attending method for a fixed-length cell exchange system for handling fixed-length cells, including an exchange switch section, a main controller for said exchange switch section, a plurality of interface sections connected to input and output sections of said exchange switch section, and a concentration section for concentrating input/output information of said plurality of interface sections, comprising the step of:
    when said concentration section detects a failure occurring in one of said plurality of interface sections, allowing said concentration section to send an alarm cell to all connections, wherein when said failed interface section is restored, said main controller informs other interface sections than said failed interface section of restoration; and said informed concentration section stops sending said alarm cell.

12. The method according to claim 9, wherein when said concentration section detects a failure occurring in one of said plurality of interface sections, said concentration section sends an alarm cell to all connections and disables counting of a charge counter in said failed interface section.

11. The method according to claim 9, wherein when said failed interface section is restored, said main controller informs other interface sections than said failed interface section of restoration; and said informed concentration section stops sending said alarm cell and said restored interface section restarts counting of a charge counter.

12. A concentration section for concentrating input/output information of a plurality of interface sections connected to input and output sections of an exchange switch section in a fixed-length cell exchange system for handling fixed-length cells, comprising:

a failure detector for detecting a failure occurring in one of said plurality of interface sections;

a connection information storage section for storing connection information about connections to said interface sections;

a connection information extractor for, upon detection of a failure in one of said interface sections by said failure detector, searching said connection information stored in said connection information storage section to extract connection information about all connections to said failed interface section; and an alarm cell transmitter for sending an alarm cell to said all connections extracted by said connection information extractor, wherein when informed of restoration of said failed interface section said alarm cell transmitter stops sending said alarm cell.

13. A failure attending method for a fixed-length cell exchange system for handling fixed-length cells, including an exchange switch section having three or more switch stages, a main controller for said exchange switch section and a plurality of interface sections connected to input and output sections of said exchange switch section, comprising the steps of:

when a failure occurs in an intermediate switch stage in said exchange switch section, allowing said main controller to send routing information about said intermediate switch stage to all implemented interface sections; and allowing each interface section having received said routing information about said intermediate switch stage to send an alarm cell to a path which matches with said received routing information, wherein when said intermediate switch stage in said exchange switch section is restored, said main controller informs all implemented interface sections of such restoration; and each of said informed interface sections stops sending said alarm cell.

14. The method according to claim 13, wherein each of said interface sections having received said routing information about said intermediate switch stage sends said alarm cell to a path which matches with said received routing information, and disables counting of a charge counter.

15. The method according to claim 14, wherein when said intermediate switch stage in said exchange switch section is restored, said main controller informs all implemented interface sections of such restoration; and each of said informed interface sections stops sending said alarm cell and restarts counting of said charge counter.

16. A failure attending method for a fixed-length cell exchange system for handling fixed-length cells, including an exchange switch section, a main controller for said exchange switch section, a plurality of interface sections connected to input and output sections of said exchange switch section and a concentration section for concentrating input/output information of said plurality of interface sections, comprising the steps of:

when said concentration section detects a failure occurring in one of said interface sections, permitting said concentration section to send a cell affixed with information indicating an alarm cell to said exchange switch section; and when other interface sections receive said cell affixed with said alarm-cell indicating information, permitting each of said other interface sections to produce a pseudo alarm cell and send said pseudo alarm cell to a line side, wherein when other interface sections receive said cell affixed with said alarm-cell indicating information, permitting each of said other interface sections to produce said pseudo alarm cell and send said pseudo alarm cell to a line side and disables counting of a charge counter.

17. A fixed-length cell exchange system for handling fixed-length cells, comprising an exchange switch section, a main controller for said exchange switch section, a plurality of interface sections connected to input and output sections of said exchange switch section and a concentration section for concentrating input/output information of said plurality of interface sections, said concentration section including:

an interface failure detector for detecting a failure in any one of said interface sections, and an alarm cell information transmitter for sending a cell affixed with information indicating an alarm cell to said exchange switch section when said interface failure detector detects an interface section failure; and each of said interface sections including:

an alarm cell information receiver for receiving said cell affixed with said alarm cell indicating information, and a pseudo alarm cell generator for generating a pseudo alarm cell and sending said pseudo alarm cell to a line side when said alarm cell information receiver receives said cell affixed with said alarm-cell indicating information, wherein each of said interface sections further includes a charge counter and a charge counter controller for disabling counting of said charge counter when said alarm cell information receiver receives said cell affixed with said alarm-cell indicating information.

18. A method of matching path information set respectively by software and hardware in an ATM exchange system including an ATM switch having a plurality of line associated sections and firmware associated with said plurality of line associated sections, and a call control processor for controlling said ATM switch, the method comprising the steps of:

setting path information by software on said call control processor so as to identify an SVC (Switched Virtual Channel) call and a PVC (Permanent Virtual Channel) call;

releasing connection data affixed with an identifier of said SVC call only on said software on said control processor during a restarting process of said call control processor; and sending a request to release said SVC call through all of said plurality of line associated sections to the hardware of said ATM switch, whereby matching of path information respectively set by said software on said call control processor and said hardware of said ATM switch is performed.

19. The method according to claim 18, wherein at a time of establishing a path connection, a call dial number and a reception dial number are sent together with an input VPI (Virtual Path Identifier)/VCI (Virtual Channel Identifier) and output VPI/VCI to said hardware of said ATM switch; and at a time of releasing said SVC call, for a released path, cell count information is given to said input VPI/VCI, said output VPI/VCI, said call dial number and said reception dial number and resultant cell count information is sent to said software on said call control processor to thereby collect charge data for said SVC call.

20. The method according to claim 18, wherein when a command is issued, an execution bit indicating connection or disconnection in progress is set in said connection data on said software of said call control processor;

when said command is executed, said execution bit is erased; and for a connection with said execution bit indicating connection in progress being set at a time of restarting said call control processor, a connection request is sent again to said hardware of said ATM switch to thereby save a PVC path, and a disconnection command is sent again to a connection with said execution bit indicating disconnection in progress being set.

21. The method according to claim 19, wherein said hardware of said ATM switch or the hardware side regularly performs a health check on said software on said call control processor; and when a health check result is unsatisfactory over a predetermined period, said hardware of said ATM switch releases a path for said SVC call itself.

22. The method according to claim 18, wherein at a time of setting a path, a logical number of a connection information grasped by said software on said call control processor is sent to said hardware of said ATM switch, and matching of logical connection between said software on said call control processor and said hardware of said ATM switch is executed using said logical number as a key.

23. The method according to claim 22, wherein said logical connection is specific to said ATM exchange system.

24. The method according to claim 22, wherein said logical connection is specific to each line.

25. The method according to claim 22, wherein said software on said call control processor regularly sends an instruction;

detailed data carried by said hardware of said ATM switch is affixed to said logical connection and resultant data is sent to said software on said call control processor; and said software on said call control processor compares connection information matching with said logical connection information as a key, with connection information sent from said hardware of said ATM switch to thereby accomplish matching.

26. The method according to claim 18, wherein after restarting said call control processor, said software on said call control processor informs each of said line associated sections of a matching process;

each of said informed line associated sections informs said software on said call control processor of presence or absence of a failure using a logical connection as a key; and said software on said call control processor compares said logical connection with information about presence/absence of a failure in said logical connection, requests said hardware of said ATM switch to send detailed failure information of a VP (Virtual Path)/VC (Virtual Channel) when there is no match, and altering a status of said software on said call control processor based on a result of comparison.

27. The method according to claim 18, wherein said hardware of said ATM switch informs that an event occurred during restarting of said call control processor;

a restart time at which said call control processor has restarted a process and a restart/recover time are detected, and a time at which said event has occurred is sent to said hardware of said ATM switch; and said software on said call control processor manages a history of old changes in a VP/VC status, sequentially searches said changes in said VP/VC status that has occurred up to a present time since said restart time included in information from said call control processor indicating an end of restarting, in an older-to-younger order, and sends data of a changed VP/VC together with said logical connection to said software on said call control processor.

28. The method according to claim 25, wherein said hardware of said ATM switch performs a health check on said software on said call control processor;

when a period for said health check is N seconds, said hardware of said ATM switch retains a history of a status of a VP (Virtual Path)/VC (Virtual Channel) over last N seconds;

when said health check provides an unsatisfactory result, said status history over last N seconds and a change in said VP/VC status until a satisfactory health check result is obtained are retained, and. when said satisfactory health check result is obtained, said retained. history of said VP/VC status is sent to said software on said call control processor.

29. The method according to claim 28, wherein in VP/VC status changes occurred from N seconds before a point of time at which an unsatisfactory health check result has been acquired to requisition of a satisfactory health check result, when a change associated with the same VP/VC occurs, old statuses of said VP/VC are discarded and a new status alone is retained.

30. The method according to claim 18, wherein said hardware of said ATM switch detects restarting of said call control processor due to a serious failure; and a connection AIS (Alarm Indication Signal) cell for an SVC connection is sent to an adjoining station based on an SVC/PVC path identifier which has previously been informed at a time of making a path connection to inform said adjoining station of releasing of said SVC connection.

31. The method according to claim 30, wherein at a time of making a path connection, said SVC/PVC path identifier and a logical connection identifier managed by said software on said call control processor have previously been sent to said hardware of said ATM switch;

an upstream station sends an AIS signal or the downstream station sends an RDI signal to said connection; and when said connection is for an SVC call, said hardware of said ATM switch, which has detected said AIS signal or said RDI signal, sends said software on said call control processor a request to release said logical connection identifier, informed at said time of making said path, through said line associated sections.

\* \* \* \* \*